United States Patent [19]

Bahn

[11] Patent Number: 5,498,919
[45] Date of Patent: Mar. 12, 1996

[54] FLAT CORE-LESS DIRECT-CURRENT MOTOR

[75] Inventor: Itsuki Bahn, Tokyo, Japan

[73] Assignee: Secoh Giken Inc., Tokyo, Japan

[21] Appl. No.: 971,985

[22] Filed: Feb. 10, 1993

[30] Foreign Application Priority Data

| Jul. 11, 1991 | [JP] | Japan | 3-264265 |
| Aug. 16, 1991 | [JP] | Japan | 3-289062 |
| Aug. 20, 1991 | [JP] | Japan | 3-291021 |
| Nov. 19, 1991 | [JP] | Japan | 3-354145 |
| Dec. 5, 1991 | [JP] | Japan | 3-357475 |

[51] Int. Cl.$^6$ ........................................ H02K 1/22
[52] U.S. Cl. ........................ 310/268; 310/68 B; 310/156; 310/43; 310/184; 310/198
[58] Field of Search ........................ 310/268, 68 B, 310/DIG. 6, 46, 177, 179, 198, 206, 234, 184, 43, 45, 40 MM, 208, 154, 156, 71, 90; 324/207.2, 207.25, 233

[56] References Cited

U.S. PATENT DOCUMENTS

| 4,125,792 | 11/1978 | Schmider | 310/268 |
| 4,143,288 | 3/1979 | Sato | 310/268 |
| 4,283,644 | 8/1981 | Kondo | 310/268 UX |
| 4,374,336 | 2/1983 | Shimitzu | 310/154 |
| 4,394,594 | 7/1983 | Schmider | 310/268 |
| 4,404,485 | 9/1983 | Ban | 310/198 |
| 4,429,240 | 1/1984 | Kishi | 310/45 |
| 4,447,751 | 5/1984 | Ban | 310/268 |
| 4,578,606 | 3/1986 | Welterlin | 310/268 |
| 4,839,551 | 6/1989 | Tomisava | 310/43 |
| 4,851,731 | 7/1989 | Saotome | 310/268 |
| 4,982,130 | 1/1991 | Cap | 310/268 |

FOREIGN PATENT DOCUMENTS

| 78886 | 5/1964 | Japan . |
| 34402 | 9/1974 | Japan . |
| 147710 | 12/1977 | Japan . |
| 26263 | 6/1983 | Japan . |
| 26264 | 6/1983 | Japan . |
| 186880 | 12/1985 | Japan . |
| 29823 | 8/1990 | Japan . |

Primary Examiner—R. Skudy
Attorney, Agent, or Firm—Bierman and Muserlian

[57] ABSTRACT

The purpose of this invention is to supply people with a flat core-less direct-current motor of high output torque, high speed and high power efficiency.

It is also a 3 phase flat core-less direct-current motor comprising a fan-shaped flat armature coils of alignment winding in which an included angle constituted by each of coil portions effective for producing a torque exceeds 180 degrees in electrical angle and a disk-shaped rotary armature constituted by the said armature coils arranged at equal pitches within a plane with their outside surfaces made radial and with each adjacent two of them kept in contact with each other and plastic in which the said armature coils are buried or a stationary armature with a magnetic body of a little iron loss functioning as a magnetic path on its one surface.

5 Claims, 17 Drawing Sheets

FLAT CORE-LESS DIRECT-CURRENT MOTOR

TECHNICAL FIELD

This invention relates to a core-less direct-current motor which is used as a power source for every industrial machine or apparatus necessitating a flat shape, particularly also necessitating a high speed and a high torque.

BACKGROUND TECHNOLOGY

We disclosed our inventions on a flat core-less direct-current motor through the Patent Gazettes of Tokukosho No. 58-26263 and Tokukosho No. 58-26264.

A strong point of the core-less direct-current motor is that it can be shaped in a flat shape, therefore it can be used in a big industrial field as mentioned above and said that it is a very useful motor.

On the other hand, its output torque is small and approximately a third of that of a cored direct-current motor of the same volume. In order to increase its output torque, the number of turns of its coil may be increased on condition that its coil material is thinner, but such a coil lowers its power efficiency. It is a problem. The space for the winding of the core-less direct-current motor must be small because to enlarge the space makes the axial length of a gap between the magnetic poles and the armature longer resulting in reducing magnetic field and decreasing the output torque.

A flat brushless and core-less direct-current motor is well-known itself, and used as a power source for a flexible disk, a hard disk and the others, but there are the following problems to be solved.

The first problem is that a mild steel plate or a silicon steel plate whose iron loss and copper loss are high are used as a magnetic body to be attached to the rear surfaces of the fan-shaped armature coils of the motor so that the magnetic flux from the poles of magnetic rotor of the motor which penetrates the said armature coils may close its magnetic path at the said magnetic body.

Consequently the maximum allowable speed of such a motor is approximately 600 rpm and its power efficiency is low resulting in narrowing its applicable field.

Because of its high speed, its output torque is reduced without the magnetic body, so it is used only in the limited special field.

The second one is that its power efficiency is low by the above-mentioned reason.

The third one is that its structure is apt to be unsuitable for a mass production because of its flatness.

Thus the purpose of this invention is to supply people with a core-less direct-current motor of high output torque, high speed, high power efficiency which is suitable for a mass production.

DISCLOSURE OF THE INVENTION

A 3 phase flat core-less direct-current motor comprises an annular stationary field magnet, a disk-shaped rotary armature, a commutator for controlling the armature current and commutator brushes characterized by comprising the said disk-shaped rotary armature constituted by fan-shaped, alignment-wound and flat armature coils in which an included angle constituted by each of coil portions effective for producing a torque exceeds 180 degrees in electrical angle and plastic in which the said armature coils are buried, the said armature coils being six in all with their outside surfaces made radial so that each adjacent two of them may be in contact with each other and arranged at equal pitches within a same plane.

A 3 phase flat core-less direct-current motor comprises disk-shaped stationary armature, a magnetic rotor including an annular field magnet and an armature current control device for controlling the said armature current by detecting the positions of the field magnet poles of the said magnetic rotor characterized by comprising the said stationary armature constituted by fan-shaped, alignment-wound and flat armature coils in which an included angle constituted by each of coil portions effective for producing a torque exceeds 180 degrees in electrical angle and plastic in which the said armature coils are buried, the said armature coils being six in all with their outside surfaces made radial so that each adjacent two of them may be in contact with each other and with a disk-shaped magnetic body of a little iron loss functioning as a magnetic path on their one side surfaces.

A 3 phase flat core-less direct-current motor. comprises an annular field magnet including 2 N poles and 2 S poles, a disk-shaped rotary armature, a commutator for controlling the armature current and commutator brushes characterized by comprising the said disk-shaped rotary armature constituted by fan-shaped, alignment-wound and flat armature coils in which an included angle constituted by each of coil portions effective for producing a torque exceeds 180 degrees in electrical angle and plastic in which the said armature coils are buried, the said armature coils being three in all with their outside surfaces made radial so that each adjacent two of them may be in contact with each other and arranged at equal pitches within a plane.

A 3 phase flat core-less direct-current motor comprises a disk-shaped stationary armature, a magnetic rotor including an annular field magnet of 2 N poles and 2 S poles and an armature current control device for controlling the said armature current by detecting the field magnet pole positions of the said magnetic rotor characterized by comprising the said disk-shaped stationary armature constituted by fan-shaped, alignment-wound and flat armature coils in which an included angle constituted by each of the coil portions effective for producing a torque exceeds 180 degrees in electrical angle and plastic in which the said armature coils are buried, the said armature coils being three in all with their outside surfaces made radial so that each adjacent two of them may be in contact with each other and with a disk-shaped magnetic body of a little iron loss functioning as a magnetic path on their one side surfaces.

A plural phase flat brushless and core-less direct-current motor comprises a plane stationary armature, a magnetic rotor including an annular field magnet of 2n N and S poles where n is a positive integer and an armature current control device for controlling the armature current by detecting the field magnet poles of the said magnetic rotor characterized by comprising the said plane stationary armature constituted by a fan-shaped winding type flat armature coils in which an included angle constituted by each of the coil portions effective for producing a torque is equal to that constituted by the poles of the said magnetic rotor and plastic in which the said armature coils are buried, the said armature coils whose volumes are large being arranged at equal pitches within a plane with their outside surfaces made radial and so that they may not lap over each other, and the rear surfaces of the said armature coils being coated with an annular magnetic body made of silicon steel rolled thinly and coiled spirally so that the magnetic flux of the said magnetic rotor which faces the front surfaces of the said armature coils may close its magnetic path at it after penetrating the said armature coils A plural phase flat brushless and core-less direct-current motor comprises a plane stationary armature, a magnetic rotor including an annular field magnet with 2n N and S poles where n is 1 to 4 and an armature current control device for controlling the said armature current by detecting the positions of the field magnet poles of the said magnetic rotor characterized by consisting of:

a cup-shaped first casing, a flat-bottomed second casing made of mild steel whose flange is fixed to that of the said first casing, a shaft supported by bearings set in the central bores of both the said casings so that it may rotate freely, a ring-shaped said magnetic rotor fixed by adhesive to a mild steel disk mounted on the said shaft, plural flat fan-shaped winding type armature coils in which an included angle constituted by each of the coil portions effective for producing a torque is equal to that of the poles of the said magnetic rotor, a stationary armature fixed to the said second casing and constituted by the said armature coils arranged at equal pitches within a plane with their outside surfaces made radial and so that they may not lap over each other and an annular magnetic body made of silicon steel rolled thinly and coiled spirally which is fixed by adhesive to one side surfaces of the said armature coils so that the magnetic flux of the said magnetic rotor may close its magnetic path, both the said armature coils and the annular magnetic body being buried in plastic charged into the space necessary for forming the said stationary armature, a mild steel disk whose central portion is fixed to the shaft on the outside of the said second casing, an annular magnet fixed to the said mild steel disk, and a means for canceling a magnetic absorption force between the said magnetic rotor and the said annular magnetic body by a reverse magnetic absorption force between the said annular magnet which is magnetized in N and S poles distributed axially and the said second casing whose outside surface faces the said annular magnet with a small gap therebetween.

A 3 phase flat brushless and core-less direct-current motor of axial gap type comprises a plane stationary armature, a magnetic rotor including an annular field magnet with 2n N and S poles where n is even number and an armature current control device for controlling the said armature current by detecting the positions of the field magnet poles of the said magnetic rotor characterized by consisting of:

plural fan-shaped and flatly-wound armature coils in which an included angle constituted by each of their coil portions effective for producing a torque is nearly equal to that of the poles of the said magnetic rotor, a flat annular magnetic body made of silicon steel of about 0.1 mm or less in thickness rolled thinly and coiled spirally, an annular stationary armature constituted by (3/2)n said armature coils arranged at equal pitches with the outside surfaces made radial and so that they may not lap over each other, the said annular magnetic body to which the said armature coils are fixed, wirings among the said armature coils with their terminals lead out and plastic in which they are buried, a means for giving a wiring to the said annular stationary armature after fixing it on a printed board of a steel base with wirings, and a shaft which is supported by bearings set in the central portion of the said stationary rotor so that it may rotate freely and fixed to the said magnetic rotor with its pole surface facing the said armature coils with a small gap therebetween.

A 3 phase flat brushless and core-less direct-current motor of axial gap type comprises a plane stationary armature, a magnetic rotor including an annular field magnet with 2n N and S poles where n is even number and an armature current control device for controlling the said armature current by detecting the positions of the field magnet poles of the said magnetic rotor characterized by consisting of:

plural fan-shaped and flatly-wound armature coils in which an included angle constituted by each of their coil portions effective for producing a torque is nearly equal to that of the poles of the said magnetic rotor, a flat annular magnetic body made of silicon steel of about 0.1 mm or less in thickness rolled thinly and coiled spirally, an annular stationary armature constituted by (3/2)n said armature coils arranged at equal pitches with the outside surfaces made radial and so that they may not lap over each other, the said annular magnetic body to which the said armature coils are fixed, wirings among the said armature coils with their terminals lead out and plastic in which they are buried, and a shaft supported by bearings set in the central portions of the said stationary armature so that it may rotate freely and fixed to the said magnetic rotor with its pole surface facing the armature coils with a small gap therebetween.

A 3 phase flat brushless and core-less direct-current motor of axial gap type comprises a plane stationary armature, a magnetic rotor including an annular field magnet with 2n N and S poles where n is even number and an armature current control device for controlling the said armature current by detecting the positions of the field magnet poles of the said magnetic rotor characterized by consisting of:

plural fan-shaped and flatly-wound armature coils in which an included angles constituted by each of their coil portions effective for producing a torque is nearly equal to that of the poles of the said magnetic rotor, a flat annular magnetic body made of silicon steel of about 0.1 mm or less in thickness rolled thinly and coiled spirally with a plastic ring of equal thickness set inside it, an annular stationary armature constituted by (3/2)n said armature coils arranged at equal pitches with the outside surfaces made radial and so that they may not lap over each other, the said annular magnetic body to which the said armature coils is fixed, wirings among the said armature coils with their terminals lead out and plastic in which they are buried, a position detection device comprising 3 magnetism-electricity conversion elements set face to face with the poles of the said field magnet between two adjacent armature coils near the circumference of the said stationary armature, a rotor speed detection device set near the circumference of the said stationary armature for obtaining electric signals in proportion to the rotor speed, a means for inserting a short downward columnar projection of the said stationary armature into the central bore of a printed board and fixing the former to the latter, a means for giving wirings among the wiring of the said printed board, the terminals of the said armature coils, the terminals of the said 3 magnetism-electricity conversion elements used for detecting positions and those of the said rotor speed detection device, and a shaft which is supported by bearings set in the central portion of the said stationary armature so that it may rotate freely and fixed to the said magnetic rotor so that its pole surface may face the said armature coil surface with a small gap therebetween.

A 3 phase flat brushless and core-less direct-current motor of axial gap type comprises a plane stationary armature, a magnetic rotor including an annular field magnet with 2n N and S poles where n is even number and an armature current control device for controlling the armature current by detecting the positions of the field magnet poles of the said magnetic rotor characterized by consisting of:

plural fan-shaped and flat armature coils of alignment winding in which an included angle constituted by each of the coil portions effective for producing a torque is equal to that of the poles of the said magnetic rotor, a flat annular magnetic body made of silicon steel of about 0.1 mm or less in thickness rolled thinly and coiled spirally inside which a plastic ring of equal thickness is set, a plane stationary armature constituted by (3/2)n said armature coils arranged at equal pitches with the outside surfaces made radial and so that they may not lap over each other, the said annular magnetic body to which the said armature coils are fixed, the first printed board of an annular thin plastic base fixed concentrically on the opposite side of the said annular magnetic body and plastic in which the above three elements are buried, a position detection device comprising 3 magnetism-electricity conversion elements which are set at proper positions on the said first printed board of the said stationary armature face to face with the poles of the said field magnet, a rotor speed detection device for obtaining electric signals of a frequency in proportion to the rotor speed through the induction output of a zigzag wiring arranged near the circumference of the said first printed board so as to form a circle at the same pitches with those of the said N and S poles which face the said first printed board and are magnetized at alternate equal pitches divided into pieces along the circumference of the said field magnet, a means for inserting a short downward columnar projection of the said stationary armature into the central portion of a second printed board and fixing the former to the latter, a means for giving necessary wirings between the output and input terminals of the said armature coils, the said 3 magnetism-electricity conversion elements and the said zigzag wiring of the said first printed board and the terminals of the said second printed board, and a shaft supported by bearings set in the central bore of the said stationary armature so that it may rotate freely and fixed to the said magnetic rotor whose pole surface faces the armature coil surface with a small gap therebetween.

A 3 phase flat brushless and core-less direct-current motor of axial gap type comprises a plane stationary armature, a magnetic rotor including an annular field magnet with 2n N and S poles where n is even number and an armature current control device for controlling the armature current by detecting the positions of the field magnet poles of the said magnetic rotor characterized by consisting of:

a plane fan-shaped and flat armature coils of alignment winding in which an included angle constituted by each of the coil portions effective for producing a torque is equal to that of the poles of the said magnetic rotor, a flat annular magnetic body made of silicon steel of about 0.1 mm or less rolled thinly and coiled spirally inside which a plastic ring of equal thickness is set, an annular stationary armature constituted by (3/2)n said armature coils arranged at equal pitches with the outside surfaces made radial and so that they may not lap over each other, the said annular magnetic body to which the said armature coils are fixed, the first printed board of an annular thin plastic base fixed concentrically to the said annular magnetic body and plastic in which the above three elements are buried, a position detection device comprising 3 magnetism-electricity conversion elements which are set at the proper positions of the said stationary armature face to face with the poles of the said field magnet, a rotor speed detection device set near the circumferences of the said stationary armature and the said field magnet, a means for inserting the short downward columnar projection of the said stationary armature into the central bore of the second printed board, a means for giving necessary wirings between the output and input terminals of the said armature coils, the said 3 magnetism-electricity conversion elements and the said first printed board of the said rotor speed detection device and the necessary terminals of the said second printed board, and a shaft supported by bearings set in the central portion of the said stationary armature so that it may rotate freely and fixed to the said magnetic rotor whose pole surface faces the said armature coil surface with a small gap therebetween.

The included angle constituted by each of the coil portions of the fan-shaped armature coils of a conventional core-less direct-current motor effective for producing a torque is 180 degrees in electrical angle as shown in broken lines B and C in FIG. 3, so the coil breadth is small as shown in a broken line 2c-3 in FIG. 3.

According to this invention, the coil is about two times wider than the conventional one as shown in a coil 2c in FIG. 3.

The conventional coil breadth is shown in F.

On the other hand, the coil breadth related to this invention is shown in E.

According to this invention, the space which the coil occupies is about two times larger than the conventional one.

Therefore the output torque related to this invention becomes about two times higher than the conventional one keeping a high power efficiency. It is an action of this invention.

In this invention, the winding type of the coils is alignment winding and the outside portions of each adjacent two of 6 coils are kept in contact with each other as shown in FIG. 3.

Therefore plastic can be charged easily into the space necessary for forming a disk-shaped armature by an injection machine.

It is a strong point of this invention.

The included angle constituted by each of the coil portions effective for producing a torque may as well exceed 180 degrees.

It is (180+60) degrees in electrical angle in this working example.

Therefore the outside surface of the conductive body constituting a coil tilts by about 10 degrees in mechanical angle from a radial broken line B or C.

As a result, the torque it produces is reduced a little, but it is no problem because it is negligible.

A magnetic body is attached to the rear surfaces of the armature coils as a means for closing the passage of the magnetic flux from the poles of a magnetic rotor.

It is made by a process in which a silicon steel plate is thinned so as to be about 50 microns in thickness followed by being coiled spirally by rolls.

Adhesive agent is coated on its surface and stiffened thereafter.

Next, it is cut into plural rings of a few millimeters in length.

Thus a magnetic ring is completed.

Such a magnetic ring is attached to the rear surfaces of the armature coils to make a magnetic path and plastic is charged into a metal mold including them to form a stationary armature with them buried in it.

Accordingly its iron loss is lowered remarkably while its power efficiency and speed are kept high.

Thus the first problem is resolved.

A casing to which the stationary armature is fixed is made of mild steel.

The central portion of a mild steel disk is fixed to a shaft and the magnetic ring is attached to it.

The magnetic ring surface which constitutes a magnetic path faces the outside surface of the casing with a small gap therebetween.

The magnetic ring is magnetized in N pole on one side and in S pole on the other.

As clarified from the constitution mentioned above, a magnetic absorption force produced between the magnetic rotor and the magnetic body acts opposite to the other magnetic absorption force produced between the casing and the magnetic ring resulting in the reduction of the axial load of a bearing of the shaft.

Thus the second problem can be solved.

A means for making a magnetic ring by cutting a silicon steel plate coiled spirally using a cutter is shown in FIG. 23 and FIG. 24 which are explained in detail later.

It enables a mass production of thin magnetic rings.

The assembly of the magnetic ring and the armature coils and plastic charged into a metal mold including the assembly by a plastic injection machine followed by the removal of the metal mold constitute a flat stationary armature.

Thus a flat motor suitable for a mass production is realized.

The stationary armature is shaped in a disk-like body in which the armature coils and the magnetic ring forming a passage of the magnetic flux are buried through a plastic injection process.

The first printed board is fixed to the upper surface or the rear surface of the armature coils if necessary before plastic is injected.

The second printed board is also fixed to the lower surface of the stationary armature thereat.

The necessary terminals of the second printed board are connected with the input and the output terminals of the armature coil of the first printed board and the other elements.

Thus the stationary armature is structured.

Bearings for the magnetic rotor are set in the stationary armature.

Such a structure enables flattening and a mass production and the third problem can be solved.

As described above, the output torque of a flat core-less direct-current motor related to this invention is two or more times higher than the conventional one though the volume of the former is equal to that of the latter.

In addition the power efficiency of the former is high.

Further this invention can supply people with a cheap motor with high output torque and high power efficiency which can be manufactured in a mass production process easily in comparison with a well-known type one with lap winding coils which is different from the winding type of this invention.

Furthermore this invention can supply people with a flat direct-current motor with high output torque, remarkably low iron loss, high speed and high power efficiency because its magnetic body functioning as a magnetic core at which the magnetic flux of the magnetic rotor closes it magnetic path is made silicon steel rolled thinly and coiled spirally followed by being cut in plural rings by a cutter.

Besides this invention can supply people with a cheap motor with high output torque and high power efficiency which can be manufactured in a mass production process easily in comparison with a well-known type one with lap winding coils which is different from the winding type of this invention.

In the case of a high output motor, the bearing life is extended because of a means for canceling a big magnetic absorption force between the magnetic rotor and the magnetic core.

In addition, this invention can supply people with a flat motor which is suitable for a mass production because its flat stationary armature consists of a spirally coiled magnetic ring, armature coils stuck on it and plastic charged into a space necessary for forming the stationary armature.

The structure of the armature coils shown in FIG. 3 can increase its output torque.

Further, in this invention, three Hall elements are used for detecting the positions of poles of the magnetic rotor.

They are set apart outward from the intermediate portion between the two adjacent armature coils.

Therefore the Hall elements can be set easily and wiring work is simplified.

Furthermore, The motor related to this invention can be set into a space formed inside a printed board.

Therefore the assembling work of a flexible disk or the like and a motor can be simplified and the whole device can be flat.

DETAILED DESCRIPTION OF DRAWINGS

FIG. 29 is a plan of a printed board 22a.

THE BEST CONDITION FOR WORKING THIS INVENTION

We explain this invention below based on some working examples on it referring to attached drawings.

All angles described below means electrical angle unless otherwise described.

Figure 1:
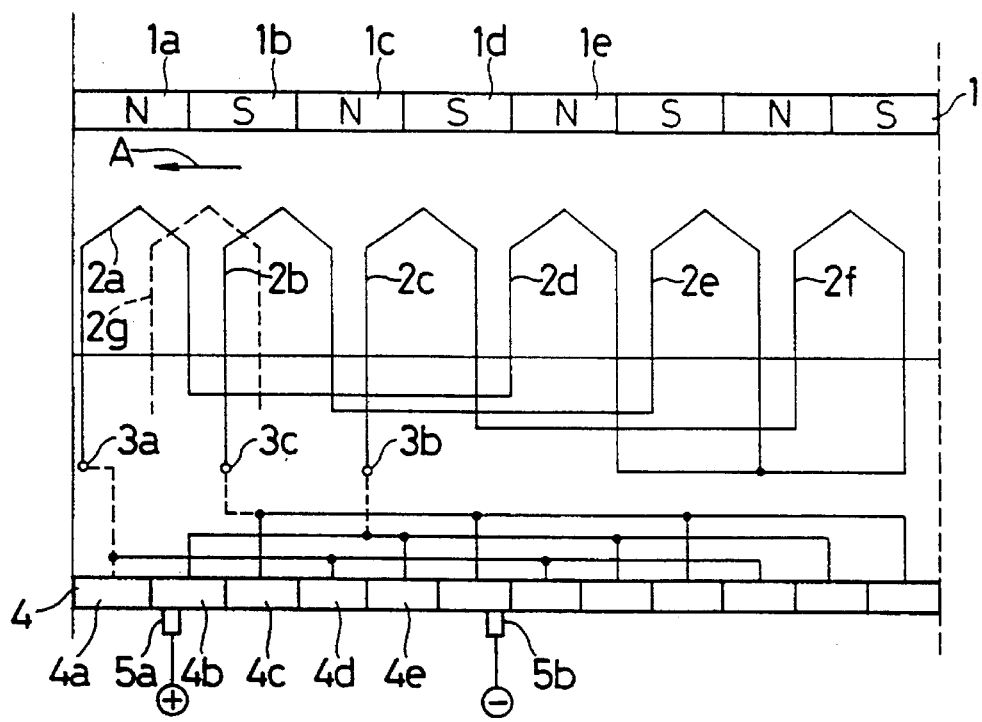
FIG. 1 is a developed view of a field magnet and armature coils.

FIG. 1 is a developed view of a field magnet and armature coils of a three phase flat core-less direct-current motor including a commutator and commutator brushes.

A field magnet 1 which is stationary consists of 4 N poles 1a, 1c, 1e, 1g, and 4 S poles 1b, 1d, 1f, 1h.

Armature coils 2a, 2g (broken lined), 2b are named the first, the second and the third phase armature coils respectively.

In this working example, the second phase armature coil 2g is substituted by the same phase armature coil 2c shown on the right side of it for convenience' sake.

Armature coils 2d, 2f are also under the same circumstances as the above armature coil.

Thus armature coils 2a, 2d are the first phase ones and armature coils 2c, 2f and 2b, 2e are the second and the third ones respectively.

Each two of the first, the second and the third phase armature coils are connected with each other in series or in parallel respectively.

In this working example, a star connection is adopted, but a delta connection may be adopted.

A commutator 4 consists of 12 commutator elements 4a, 4b, . . . , 4l.

Commutator brushes 5a, 5b are in contact with it and a plus and a minus polarity terminals supply the load with direct-current as shown in FIG. 1.

Terminals 3a, 3b, 3c are connected with the commutator elements 4a, 4b, 4c, . . . as shown in broken lines.

The included angle constituted by each of the conductive coil portions of the armature coils 2a, 2b, . . . effective for producing a torque is 180 degrees.

They are arranged at pitches of 60 degrees.

In the case of a brushless direct-current motor, the field magnet 1 rotates and a Hall element detects the position of its magnetic pole.

A means for getting such a position detection signal may be well-known.

Figure 2:
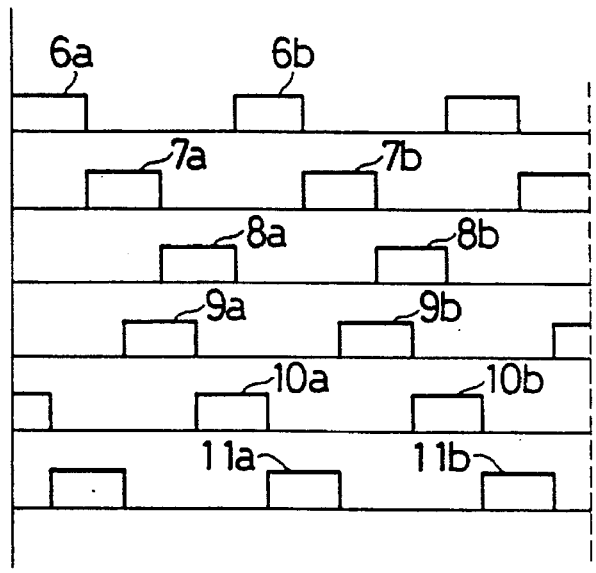
FIG. 2 is a time chart on position detection signals.

A time chart about the above-mentioned position detection signals is shown in FIG. 2 which is a developed view.

The length of each rectangle namely each curve 6a, 6b, . . . shown in FIG. 2 is 120 degrees and they are arranged at pitches of 360 degrees.

The phase of each curve 7a, 7b, . . . is late from that of each curve 6a, 6b, . . . by 120 degrees in turn and the phase of each curve 8a, 8b, . . . is late from that of each curve 7a, 7b, . . . by 120 degrees likewise.

The phase of each curve 9a, 9b, . . . is late from that of each curve 6a, 6b, . . . by 180 degrees in turn.

The phase of each curve 10a, 10b, . . . is late from that of each curve 9a, 9b, . . . by 120 degrees in turn and the phase of each 11a, 11b, . . . is late from that of each curve 10a, 10b, . . . is by 120 degrees likewise.

A well-known type 3 phase transistor bridge circuit is adopted here. Thus the armature coils 2a, 2d are energized back and forth by the lengths of the curves 6a, 6b, . . . in turn and by the lengths of the curves 9a, 9b, . . . in turn respectively.

The armature coils 2c, 2f are energized back and forth by the lengths of the curves 7a, 7b, . . . in turn and by the lengths of the curves 10a, 10b, . . . in turn respectively.

The armature coils 2b, 2e are energized back and forth by the lengths of the curves 8a, 8b, . . . in turn and by the lengths of the curves 11a, 11b, . . . in turn respectively.

Through such an energization system, a field magnet 1 rotates.

This is a principle of a brushless direct-current motor.

This invention may be applied to a brush type as well as a brushless type.

Figure 4:
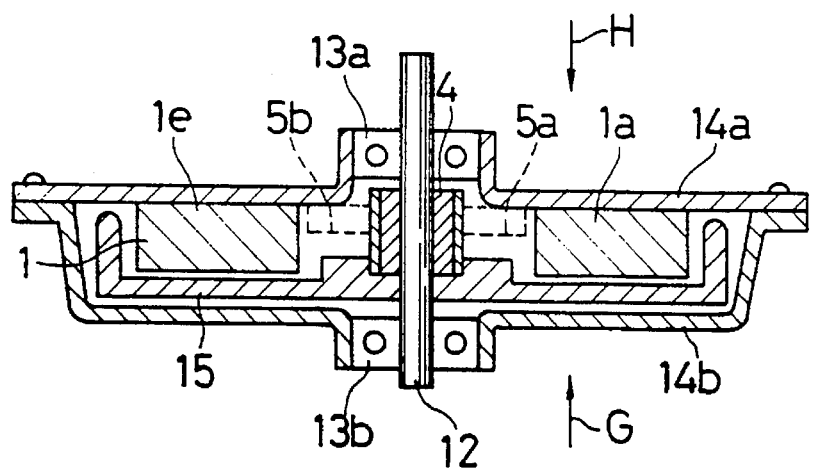
FIG. 4 is a sectional view of this invention including a commutator and commutator brushes.

At first we explain a brush type motor with a commutator and commutator brushes in it in detail referring to FIG. 4.

A ball bearing 13a is set in a housing of the central portion of an upper casing 14a made of mild steel and supports a shaft 12 allowing it to rotate freely.

An annular magnet 1 with magnetic poles 1a, 1e is attached to the inside surface of an upper casing 14a.

Figure 6:
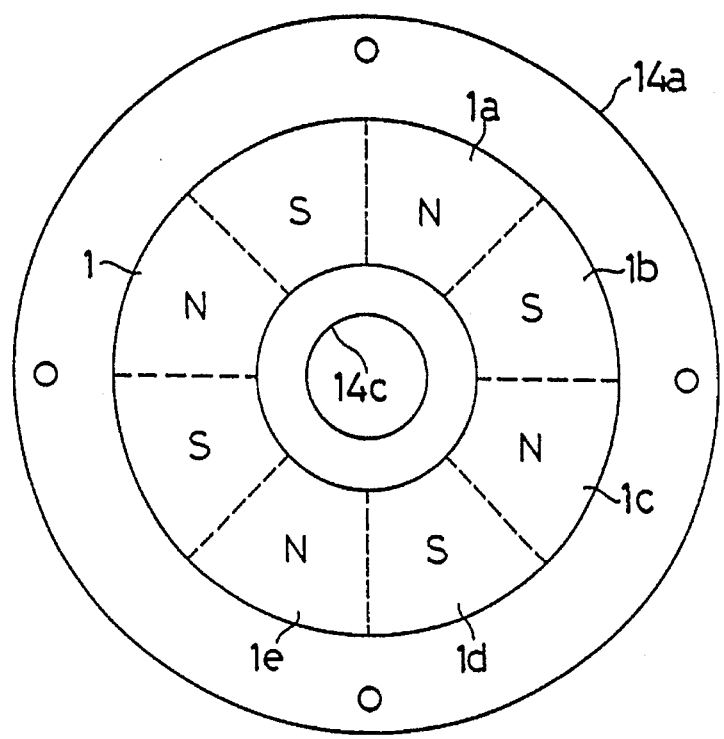
FIG. 6 is a plan of field magnet poles.

FIG. 6 is an arrow G direction view of the upper casing shown in FIG. 4.

Magnetic poles 1a, 1b, . . . are arranged at intervals of a constant angle and N poles alternate with S poles.

A ball bearing 13a is inserted into a bore 14c.

The magnet 1 is shaped in an annular shape.

Referring back to FIG. 4, another ball bearing is set in a housing of the central portion of a lower casing 14b made of mild steel and supports the shaft 12 allowing it to rotate freely.

The flange of the upper casing 14a is joined to that of the lower casing 14b by bolts as shown in FIG. 4.

The central portion of a rotor 15 is fixed to the shaft 12.

The rotor 15 functions as a rotary armature.

A commutator 4 is set at the central portion of the rotor and rotates with the rotor 15 at the same time.

Brushes 5a, 5b shown in broken lines is supported by brush supports and are kept in contact with a commutator surface.

Figure 5:
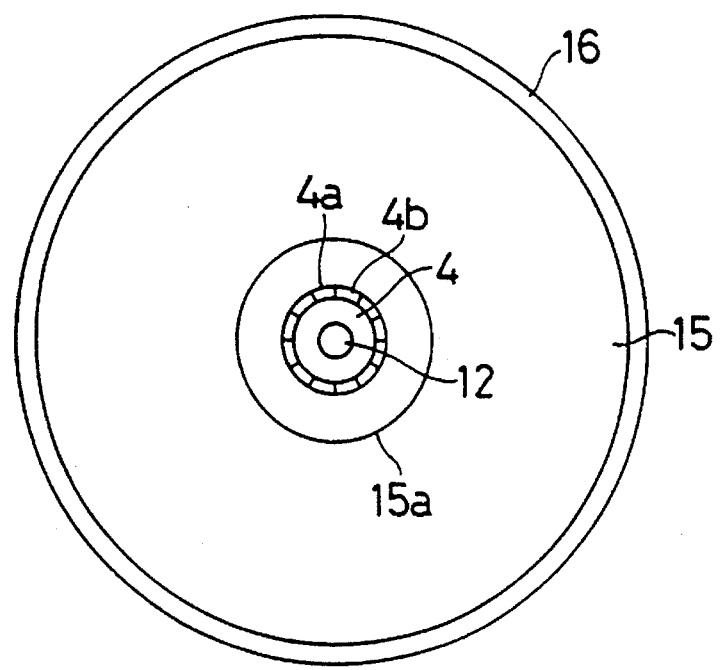
FIG. 5 is a plan of a rotary armature.

FIG. 5 is an arrow H direction view of the rotor shown in FIG. 4. The rotor 15 is disk-like.

Figure 3:
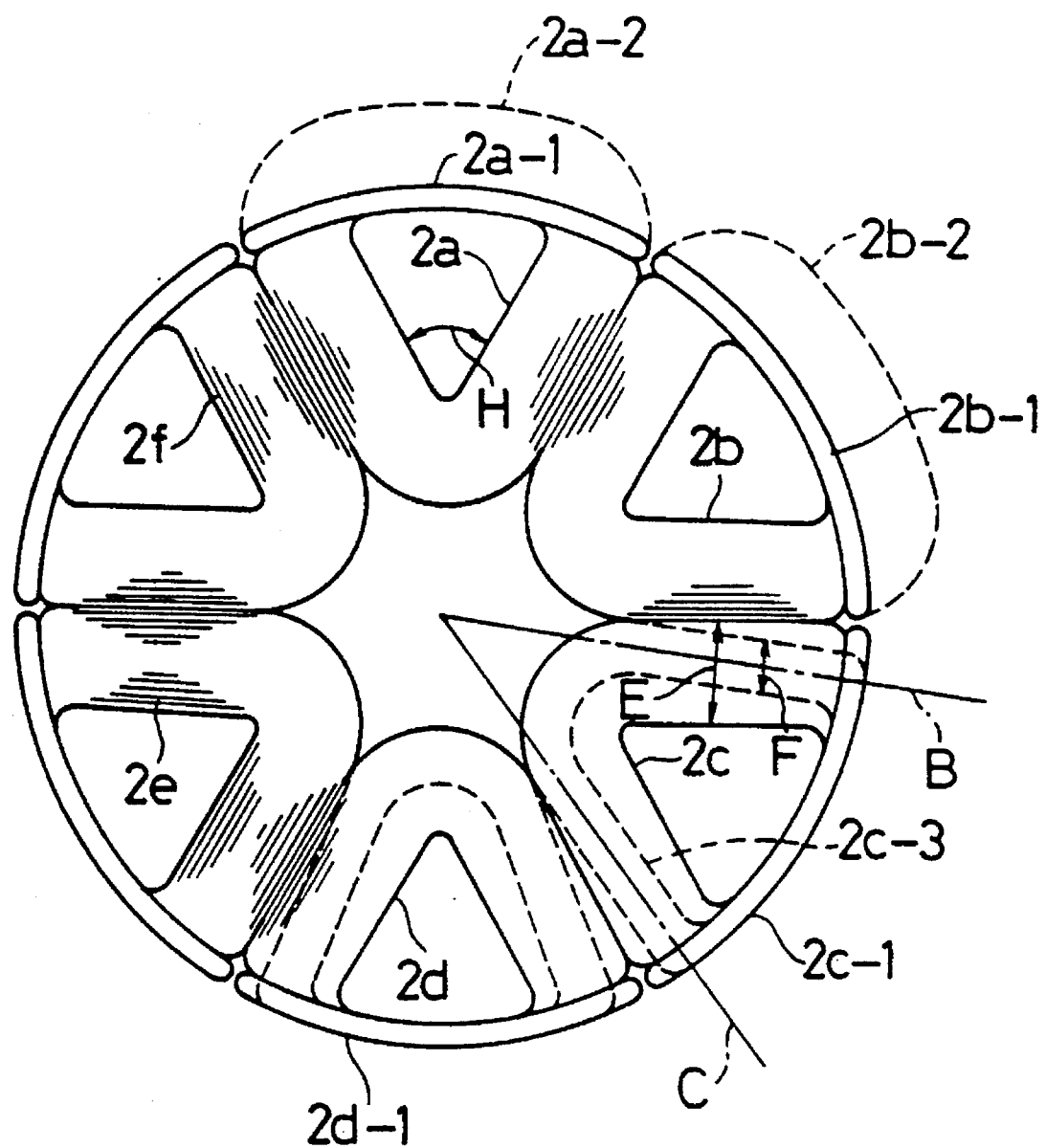
FIG. 3 is a drawing for explanation of the armature coil arrangement.

Armature coils described later referring to FIG. 3 are buried in the rotor 15.

The rotor is constituted by the armature coils and plastic which are shaped in a metal mold.

The lower end portion of the commutator 4 and the shaft 12 inside it are buried in the projecting boss 15a of the central portion of the rotor 15.

The circumferential portion of the rotor 15 is projecting upward.

The projection 16 reinforces the disk-like rotary armature 15.

The circumferential bent portions of the armature coils are buried in the projecting portion 16 of the rotor 15 as described later referring to FIG. 3.

In FIG. 3, armature coils 2a, 2b, ... are of equal shape and fan-like.

Their winding type is alignment winding. Thus the space those coils occupy is maximized.

The terminals of those windings which are not illustrated are connected with the commutator through pertinent wirings.

The circumferential portions of the coils 2a-2, 2b-2, ... have nothing to do with the production of a torque, so they are bent upward to the positions 2a-1, 2b-1, ... respectively.

The other armature coils are put on the same circumstances.

The included angle constituted by the coil portion which is necessary for producing a torque as shown by H can be more than 180 degrees and it is (180+60) degrees in this working example.

According to a conventional means, the coil portion effective for producing a torque is arranged radially as shown in chain lines B, C symbolically and in broken lines 2c-3 actually. On the other hand, the breadth of the coil is shown by F while that in this invention is shown by E.

As a result, the number of winding in this invention is nearly two times larger than that in the conventional means.

Accordingly this invention lowers the copper loss and increases the output torque.

It is an effect as well as an action of this invention.

The outside portions of each two adjacent armature coils are kept in contact with each other, so it is easy to arrange them.

Each outside surface of the coil portion effective for producing a torque tilts by 10 degrees in comparison with the radial chain line B or C, so the torque produced by the coil is reduced a little, but it is no problem because such a reduction is negligibly small.

Those armature coils and a commutator 4 are put on a metal mold arranged as shown in FIG. 5 and plastic injected into the metal mold by an injection machine (not shown).

Thus the rotary armature is completed as shown in FIG. 5.

The bent portions of the armature coils 2a-1, 2a-2, ... are buried in the circumferential upward projecting portion 16 of the rotary armature shown in FIG. 4 and FIG. 5.

In order to lower the height of the bent portions 2a-1, 2b-1, ..., they may be bent doubly.

A motor with a rotor of lap winding (about five laps) shaped in a disk shape is in the market.

In such a motor, the axial length of the rotary armature is increased because the armature coils are bent after bent forming multi-laps.

Therefore, the gap between the magnetic poles and the lower casing 14b is increased and the magnetic field is weakened.

As a result, the output torque is reduced and the copper loss is increased.

In addition, such a motor is not suitable for a mass production because it is troublesome to put the armature coils in a metal mold for shaping a rotor.

This invention can solve all such problems.

In FIG. 5, when a plastic layer 16 of about a millimeter in thickness forms on a surface of the rotary armature 15, its strength is increased, so in the case of a motor with a high output torque, such a plastic layer is effective.

On the other hand, although there is no gap between each two adjacent armature coils 2a, 2b, ... in FIG. 3, there may be a small gap between them into which plastic is charged because such a structure is also effective for the reinforcement of the rotary armature 15.

Figure 7:
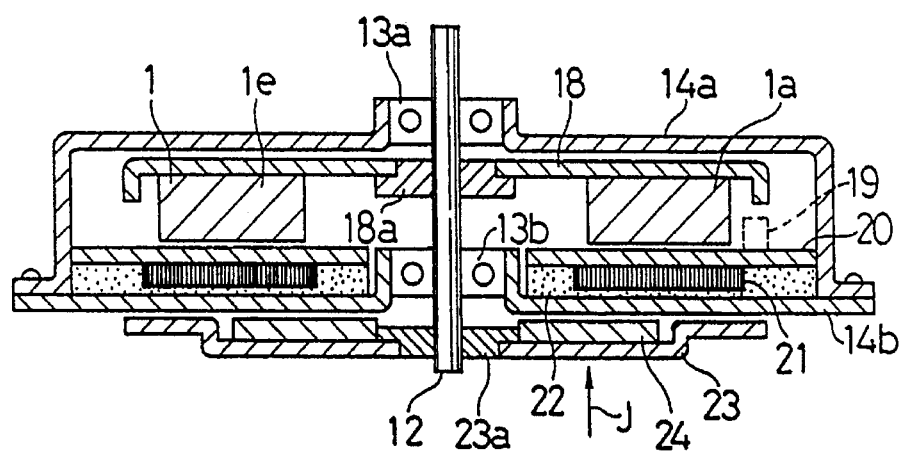
FIG. 7 is a sectional view of a brushless direct-current motor related to this invention.

Next, we explain a working example of this invention applied to a brushless direct-current motor referring to FIG. 7.

An upper casing 14a, a shaft 12 and a ball bearing 13a are the same constituents as in FIG. 4, but a magnetic 1 including magnetic poles 1a, 1e is attached to the lower surface of a disk 18 made of mild steel instead of the upper casing 14a.

A metallic boss 18a which is fixed to the central portion of the disk 18 is mounted on the shaft 12 concentrically.

A lower casing 14b and another ball bearing 13b are the same constituents as in FIG. 4. The flanges of the upper and the lower casings 14a, 14b are joined by bolts.

An annular stationary armature with elements 20, 21 buried in it which is shaped by a plastic injection machine is fixed to the upper surface of the lower casing 14b.

Dotted parts represent plastic.

The parts or elements 20 are armature coils 2a, 2b, ... mentioned above referring to FIG. 3, and the elements 21 are annular magnetic core 21 which is attached to them.

The former element 20 and the latter element 21 are shaped in a ring 22 by the aid of a plastic injection machine.

The constitution of the magnetic poles of a magnet 1 is the same with that of the magnet 1 shown in FIG. 6.

The ring 22 is fixed to the upper surface of the lower casing 14b.

The circumferential portions 2a-2, 2b-2, ... of the armature coils 2a, 2b, ... are not bent upward being different from those shown in FIG. 3, and extend radially forming a flat armature coil body together with the inner portions of them.

The part or element or magnetic core 21 constitutes a magnetic path of the magnetic flux coming from the poles 1a, 1b, ... of the magnet 1. The magnetic flux passes the armature coils and closes its magnetic path at the magnetic core 21.

An iron loss in the magnetic core is caused by the rotation of the shaft with the disk 18 and the magnet 1.

A conventional means for laminating a silicon steel plate on a certain material to make a magnetic core can not be adopted, so the following means is adopted in this invention.

The first means is to use material consisting of silicon steel and plastic on condition that the power volume ratio of silicon steel/plastic before mixing and shaping is 60%/40%.

In this means the magnetic loss is doubled but it is no problem for a low output motor.

The second means described below is adopted for a high output motor.

The thickness of a silicon steel plate for the magnetic core of a motor is 0.5 mm, but in this invention it is rolled until its thickness reaches about 50 microns which is about a tenth of the conventional one.

Such a rolled silicon steel is coiled spirally after adhesive is coated on it. After the adhesive is hardened, the coiled plate is cut into rings of a certain thickness by a cutter.

Thus the annular magnetic core 21 shown in FIG. 7 is completed.

The iron loss of this magnetic core is a hundredth of that of the magnetic core of 0.5 mm in thickness.

Such a thin plate can be coiled easily. Those are merits of this invention.

Therefore this is the most suitable for such a motor with a high output and a high speed.

Figure 8:
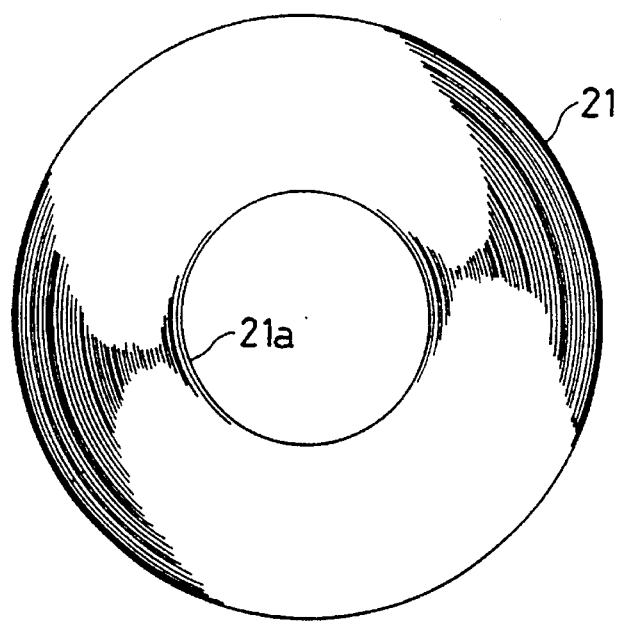
FIG. 8 is a plan of a magnetic core 21.

FIG. 8 is a plan which is an arrow J direction view on the magnetic core 21 shown in FIG. 7. A bore 21a at its central portion is shown there.

In FIG. 7 a support 19 containing a Hall element is fixed to the upper surface of the stationary armature body 22 shaped by a plastic injection machine.

Three Hall elements are attached to it in fact, but only one is shown in FIG. 7.

The Hall elements are set face to face with the circumferential surface of the magnetic poles of the rotary magnet 1 where the number and the phase of the N and the S poles are the same with those of the field magnet poles 2a, 2b, . . .

They detect the pole positions and send the detection signals to a well-known means which converts them into electrical signals necessary for a time chart shown in FIG. 2.

Thus the output torque of the magnetic rotor including magnets shown in FIG. 7 is produced through a 3 phase transistor bridge circuit mentioned above and a 3 phase flat brushless direct-current motor is realized.

In this structure, the armature is flat and a volume ratio shown in coil/armature is high, so the output torque and the power efficiency are as high as those shown in FIG. 4.

It is an effect as well as an action of this invention.

In the case of a high output motor, the rotary magnet 1 is large and the axial magnetic absorption force between the magnetic core 21 and it is big, so the life of the ball bearing 13b is shortened and the friction loss is increased.

This problem can be solved by the following means.

A metallic disk 23a is fixed to the shaft 12 and a mild steel disk 23 is fixed to its outward portion.

An annular magnet 24 is attached to the upward surface of the mild steel disk 23 and the upper surface of the annular magnet 24 is magnetized in an N pole uniformly and the lower surface in an S pole uniformly.

The upper surface of the annular magnet 24 is set face to face with the lower casing 14b keeping a small gap between them.

The magnetic path is enclosed with the mild steel disk 23, its adjacent parts and the lower casing 14b, so a strong magnetic absorption force produced in the opposite direction cancels the above-mentioned axial force acting on the bearing 13b.

The magnetic flux of the annular magnet 24 penetrates the lower casing 14b made of mild steel, but its quantity does not change during rotation.

As a result, there are no iron loss and no torque loss.

Thus the above-mentioned problem can be solved.

Figure 9:
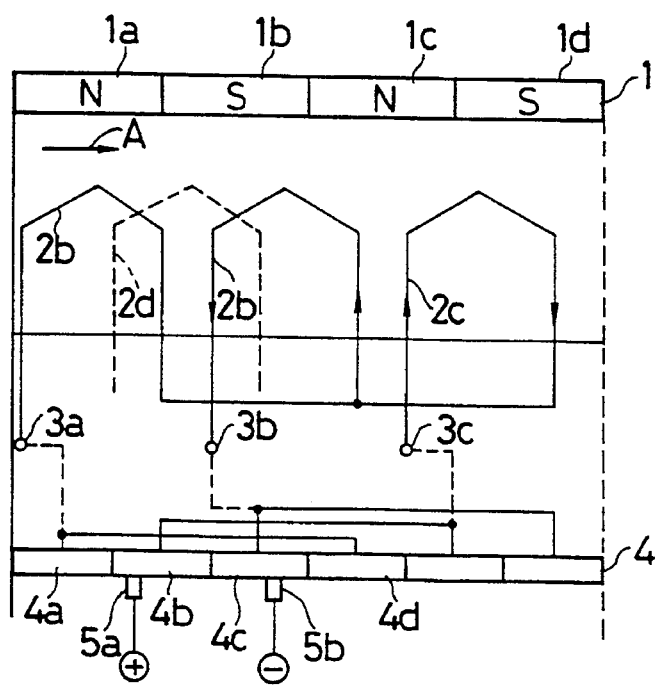
FIG. 9 is a developed view of a field magnet and armature coils.

FIG. 9 is a developed view showing a relation between a field magnet and armature coils of a 3 phase flat core-less direct-current motor with a commutator and commutator brushes.

The field magnet 1 is stationary and consists of 2 N poles 1a, 1c and 2 S poles 1b, 1d. Armature coils 2a, 2d (shown in a broken line), 2b show the first, the second and the third phase armature coils respectively.

In this invention, the armature coil 2d is replaced with the same phase armature coil 2c shown right of it for convenience' sake.

Therefore the armature coils 2a, 2c, 2b represent the first, the second and the third phase armature coils respectively.

In this working example, the type of the connection among them is a star connection.

A commutator 4 consists of six commutator elements 4a, 4b, ... and two brushes 5a, 5b are kept in contact with it.

Thus a plus and a minus pole terminals supply the load with direct current.

Terminals 3a, 3b, 3c are connected with the commutator elements 4a, 4b, ... as shown in broken lines in FIG. 9 and the armature coils and the commutator rotate at the same time in an arrow A direction.

The included angle constituted by each of the conductive portions of the armature coils 2a, 2b, ... which are effective for producing a torque are 180 degrees and the armature coils are arranged at pitches of 60 degrees.

In the case of a brushless direct-current motor, a field magnet 1 rotates and Hall elements detect the positions of the magnet poles.

A well-known means converts the detection signals into the electrical signals necessary for a time chart.

A time chart shown in FIG. 2 is made based on the electrical signals mentioned above.

The detailed explanation for it shall be omitted because its principle is fundamentally equal to that mentioned above.

Figure 11:
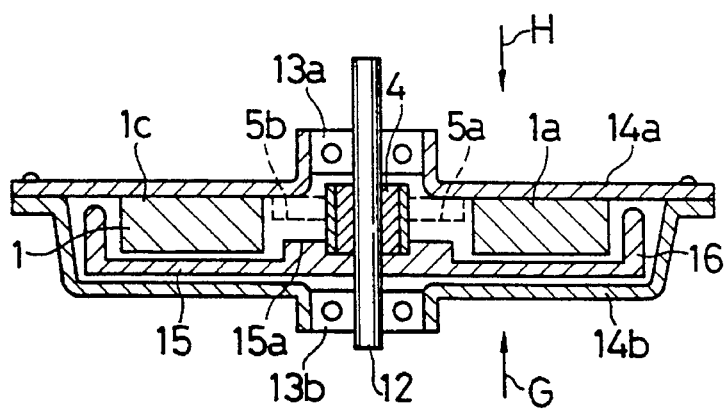
FIG. 11 is a sectional view of this invention including a commutator and commutator brushes.

Next, we explain a motor with a commutator and brushes in detail referring to FIG. 11.

A ball bearing is set in the central bore of a disk-like upper casing 14a made of mild steel and supports a shaft 12 so that it may rotate freely. An annular magnet 1 with magnetic poles 1a, 1c is attached to the rear surface of the upper casing 14a.

Figure 12:
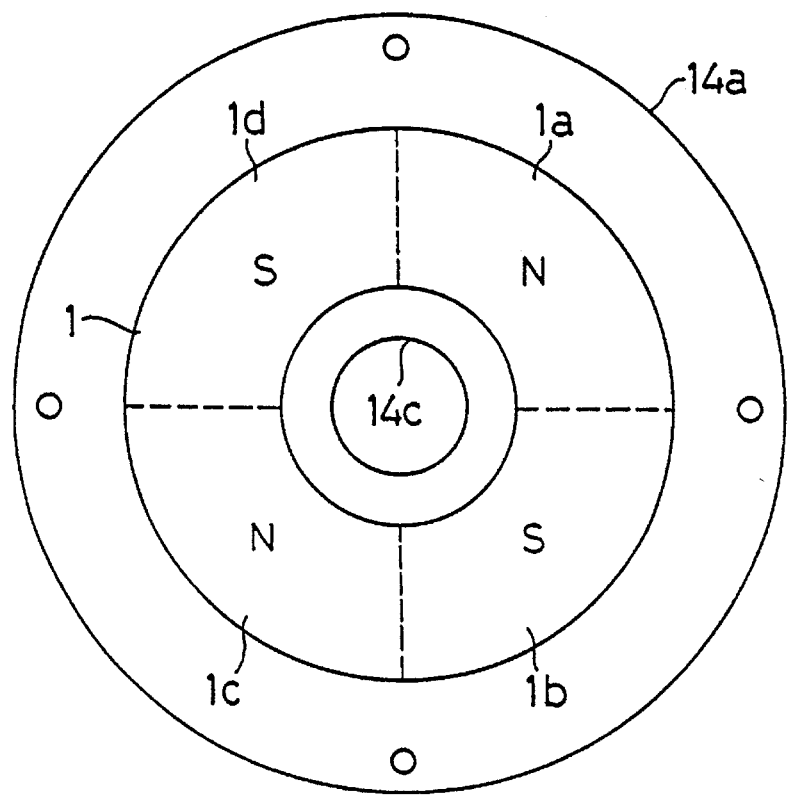
FIG. 12 is a plan of field magnet poles.

FIG. 12 is an arrow G direction view on the upper casing 14a shown in FIG. 11.

Magnetic poles 1a, 1b, ... are magnetized in N poles and S poles alternately and those poles are arranged at regular intervals.

A ball bearing 13a is set in the bore 14c.

A magnet 1 which consists of the above poles 1a, 1b, . . . is shaped in a ring.

Referring back to FIG. 11, another ball bearing 13b is set in the central portion of the lower casing 14b made of mild steel and supports a shaft 12 so that it may rotate freely.

The flanges of both the casings 14a, 14b are joined to each other as shown in FIG. 11.

The central portion of a rotor 15 is fixed to the shaft 12.

The rotor 15 functions as a rotary armature.

A commutator 4 is fixed to its central portion and rotates with the rotor 15 at the same time. Brushes 5a, 5b which are supported by brush supports are kept in contact with the commutator 4.

FIG. 5. is an arrow H direction view on the rotor 15 shown in FIG. 11 as well as the rotor 15 shown in FIG. 4.

Figure 10:
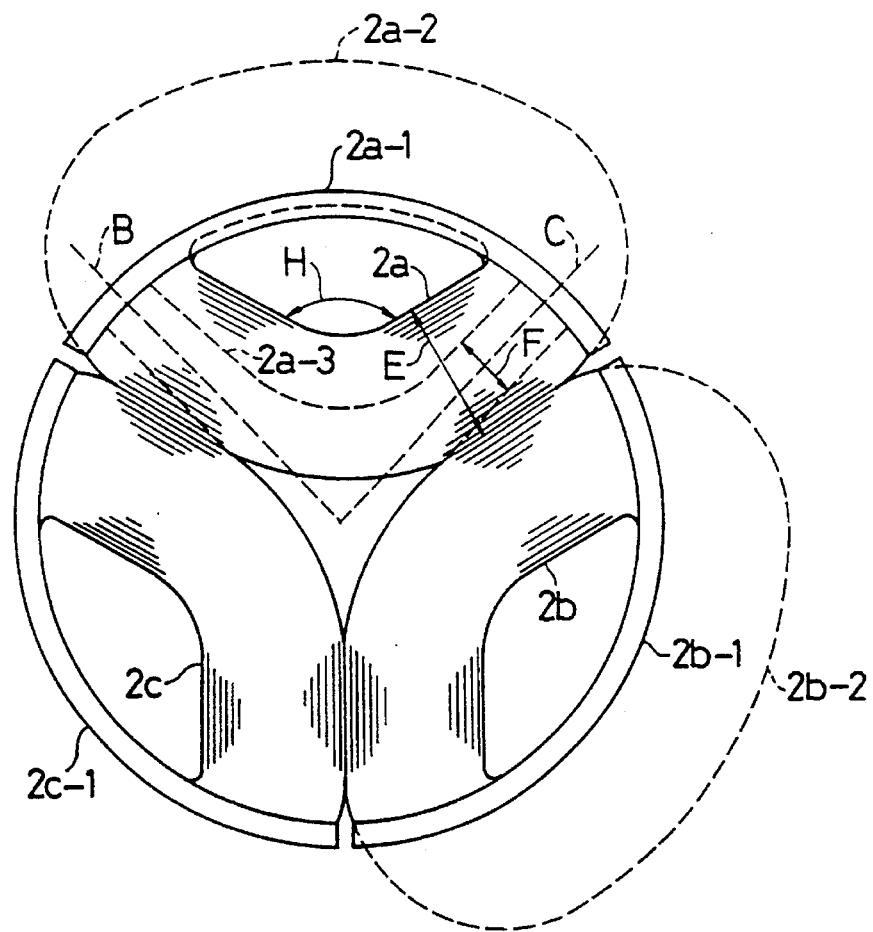
FIG. 10 is a drawing for explanation of the armature coil arrangement.

In FIG. 10, armature coils 2a, 2b, . . . are fan-shaped ones of equal dimensions.

They are wound in alignment and the space which the winding occupies is maximum.

Their shapes are the same with one another.

The terminals of the winding are not illustrated but in fact the terminals are connected with the commutator 4 through a certain wiring.

The circumferential portions of the windings 2a-2, 2b-2, 2c-2 have nothing to do with the production of a torque, so they are bent upward and such bent portions are shown in 2a-1, 2b-1, 2c-1.

The included angle H constituted by each of the coil portions effective for producing a torque is more than 180 degrees.

In this working example it is (180+60)degrees.

According to a conventional means, the direction of the coil portion of the armature coil effective for producing a torque is radial, namely, a broken line B or C direction.

In such a structure, an armature coil is shaped in a broken lined shape 2a-3 and the breadth of the coil is shown in F.

On the other hand, according to this invention, the breadth of the coil is shown in E and the number of the winding is nearly two times more than that in the above structure.

Accordingly the copper loss is reduced and the output torque is increased.

It is an effect as well as an action of this invention.

The outside surfaces of each two adjacent armature coils are kept in contact with each other, so they can be arranged easily.

But a gap of about 1 mm between the outside surfaces of each two adjacent armature coils may be made to charge plastic in it using an injection machine because of the reinforcement of the disk-like armature as described later.

When plastic of about 1 mm in thickness is laminated on one side surface of the armature coils 2a, 2b, 2c by an injection machine, the outside surfaces of each two adjacent armature coils may be kept in contact with each other as shown in FIG. 10.

The outside surface of the coil portion effective for producing a torque tilts by about 10 degrees of a radial broken line B or C, so the torque is lowered a little but it is no problem because the torque reduction is negligibly small.

After plastic is injected into a metal mold in which the armature coils and the commutator 4 are arranged as shown in FIG. 11 by an injection machine, a rotary armature shaped in a shape shown in FIG. 5 is completed.

The circumferential portions 2a-1, 2b-1, . . . of the armature coils are buried in the circumferential projections 16 shown in FIG. 5.

In order to lower the height of the bent portion, the circumferential portion may be bent doubly.

A motor including a disk-like rotor of lap winding (about 5 laps) is in the market, but the circumferential portion of the armature coil extends outward, so the axial thickness of the rotary armature is increased.

Therefore a gap between the magnetic poles and the lower casing 14b facing them is increased and the strength of the magnetic field is lowered.

As a result, the output torque is reduced and the copper loss is increased.

On the other hand, it is troublesome to arrange the armature coils at their determined positions in a metal mold before plastic injection, so such a structure is not suitable for a mass production.

They are problems.

This invention can solve these problems.

It is a strong point of this invention.

Figure 13:
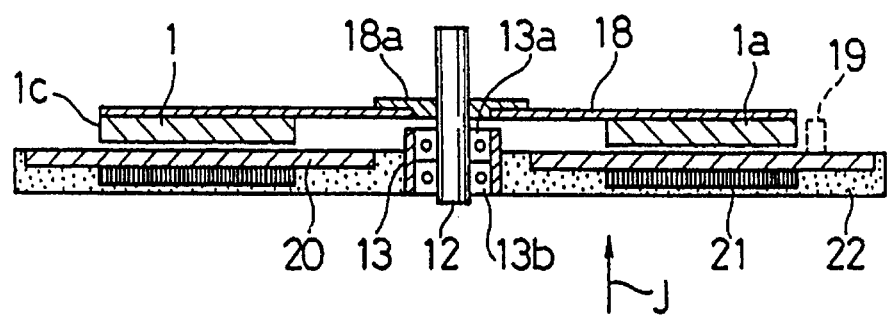
FIG. 13 is a sectional view of a brushless direct-current motor related to this invention.

Next, we explain a working example of a brushless direct-current motor to which this invention is applied referring to FIG. 13.

An armature coil 20 shaped in a shape shown in FIG. 10 is buried in the upper portion of a disk 22 shaped by a plastic injection machine.

The lower half of a metallic cylinder 13 is fixed to the central bore of the disk 22 and two ball bearings 13a, 13b are set inside the cylinder 13.

A shaft 12 is supported by the ball bearings 13a, 13b so that it may rotate freely.

A metallic disk 18a is fixed to the central bore of a mild steel disk 18 and mounted on the shaft 12.

An annular magnet 1 is attached to the lower surface of the mild steel disk 18 and functions as a magnetic rotor which rotates with the shaft at the same time.

A magnetic core 21 constituting a magnetic path together with the armature coil 20 are buried in the disk 22.

Dotted portions represent plastic.

The pole arrangement of the magnet 1 in this working example is the same with that shown in FIG. 12 which is mentioned above.

The circumferential portions 2a-2, 2b-2, . . . of the armature coils 2a, 2b, . . . buried in the disk shaped by a plastic injection machine are not bent upward, so the whole disk is flat.

The magnetic core 21 constitutes a magnetic path of the magnetic flux between the poles 1a, 1b, . . . of the magnet 1 and the disk 22 and the magnetic flux closes its magnetic path penetrating the armature coil.

The rotation of the shaft with the mild steel disk 18 and the magnet 1 causes an iron loss in the magnetic core 21.

A well-known means for laminating a silicon steel plate on a certain material can not be adopted from the viewpoint of constitution, so the first and the second means described below are used for this invention.

The first means is to use a ring made of silicon steel and plastic whose mixture ratio is 60% to 40% in powder volume before plastic injection.

In this means, a magnetic resistance is two times higher than that of the above well-known means, but it is no problem for a low output motor.

The second means described below is adopted for a high output motor.

The thickness of a silicon plate constituting a magnetic core of a conventional type motor is 0.5 mm.

In this invention, the plate is rolled further until its thickness reaches a tenth of the initial one, namely about 50 microns.

Such a thin silicon plate is coated with adhesive agent, coiled spirally and left as it is until the adhesive agent is hardened. Next, the coil is cut in rings of equal thickness by a cutter.

Thus the annular magnetic core 21 shown in FIG. 13 is completed.

The iron loss of such a magnetic core is a hundredth of that of 0.5 mm in thickness, and it is easy to coil a thinner silicon steel plate spirally.

They are strong points of this invention.

Therefore this invention supplies people with a magnetic core which is the most suitable for a motor of high output power and high speed.

FIG. 8 is an arrow J direction view on the magnetic core 21 shown in FIG. 13.

A central bore 21a is shown in FIG. 8. A support 19 comprising a Hall element is fixed to the flat disk as shown in FIG. 13.

Three Hall elements are used practically but only one is shown representatively in FIG. 13.

These Hall elements are set face to face with the circumferential magnetic poles of the magnet 1 to detect their positions.

The phase and the number of their N poles and S poles are the same with those of the field magnet poles $2a$, $2b$, . . . .

The position detection signals of the hole elements are converted into electrical signals for a time chart shown in FIG. 2 by a well-known means.

Thus the output torque of the magnetic rotor comprising a magnet 1 shown in FIG. 13 is gained through a three phase transistor bridge circuit and a three phase flat brushless direct-current motor is realized.

In such a motor an armature is flat and the volume ratio of coils to the armature is large, so its output torque and power efficiency are as high as those of a motor of the structure shown in FIG. 11.

It is an effect as well as an action of this invention.

A magnetic absorption force is produced between the magnetic core 21 and the magnet 1.

Ball bearings 13a, 13b accept this force with little friction loss.

Figure 14:
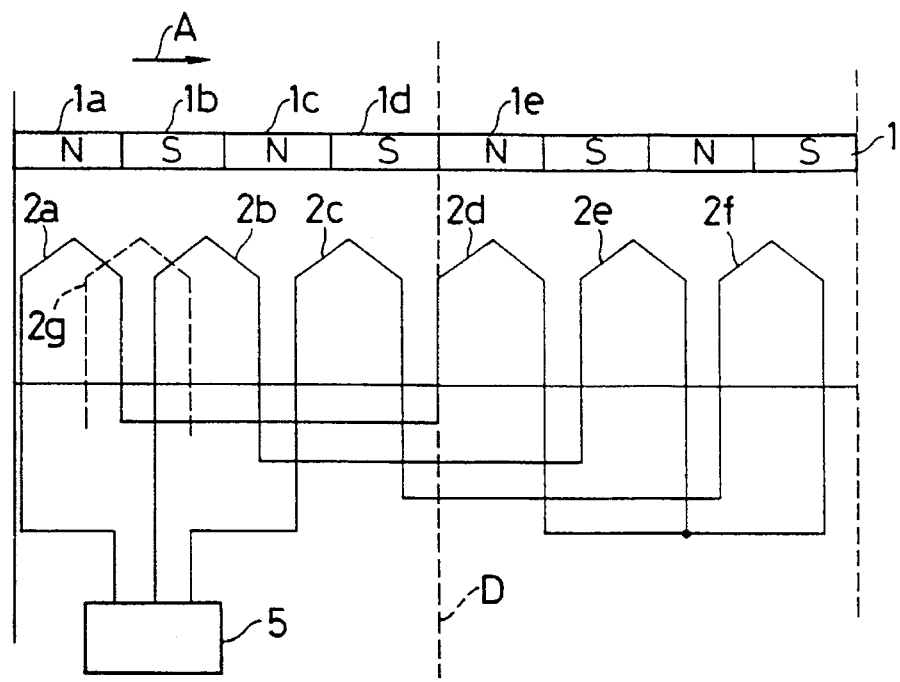
FIG. 14 is a developed view of a field magnet and armature coils.

FIG. 14 is a developed view showing the relation between a magnet functioning as a field magnet and armature coils of a 3 phase flat brushless core-less direct-current motor.

A magnet 1 consists of 4 N poles $1a$, $1c$, . . . and 4 S poles $1b$, $1d$, . . . .

Armature coils $2a$, $2g$ shown in a broken line and $2b$ are the first, the second and the third phase armature coils respectively.

In this invention, the armature coil $2g$ is substituted by an armature coil $2c$ of the same phase shown right for convenience' sake.

An armature coil $2f$ is put under the same circumstances.

Therefore armature coils $2a$, $2d$ are the first phase ones, armature coils $2c$, $2f$ are the second phase ones and armature coils $2b$, $2e$ are of the third phase ones.

Each two armature coils constituting each phase ones are connected with each other in series, but may be connected in parallel.

The connection type in this working example is a star connection but a delta connection may be used.

An included angle constituted by each of conductive armature coils $2a$, $2b$, . . . effective for producing a torque is 180 degrees and they are at pitches of 60 degrees.

In the case of a brushlees direct-current motor, a field magnet 1 rotates and hole elements detect the positions of its poles.

A well-known means is used to catch the direction signals of the Hall elements and convert them into electrical signals for a time chart.

A time chart made by the electrical signals is shown in FIG. 2.

The explanation about it shall be omitted here because its principle is the same with that described above.

The length of each signal on the time chart shown in FIG. 2 is 120 degrees, so each armature coil is energized by the range of 120 degrees.

A rectangular part 5 shown in FIG. 14 is a well-known three phase star type transistor bridge circuit for energizing the armature coils mentioned above.

Hall elements are not illustrated, but three hole elements are used practically for detecting the magnetic flux of each pole of a magnetic rotor.

Next, we explain the structure in detail referring to FIG. 7.

A ball bearing is set in a central bore of an upper casing 14a made of mild steel and a shaft 12 is supported by it so as to rotate freely.

A metallic disk 18a is fixed to the shaft 12 inside the upper casing 14a.

The central portion of a mild steel disk 18 is fixed to the circumference of the metallic disk 18a.

The steel disk 18 functions as a yoke.

An annular magnet 1 including magnetic poles $1a$, $1e$ is attached to the lower surface of the mild steel 18.

They constitute a magnetic rotor.

Figure 15:
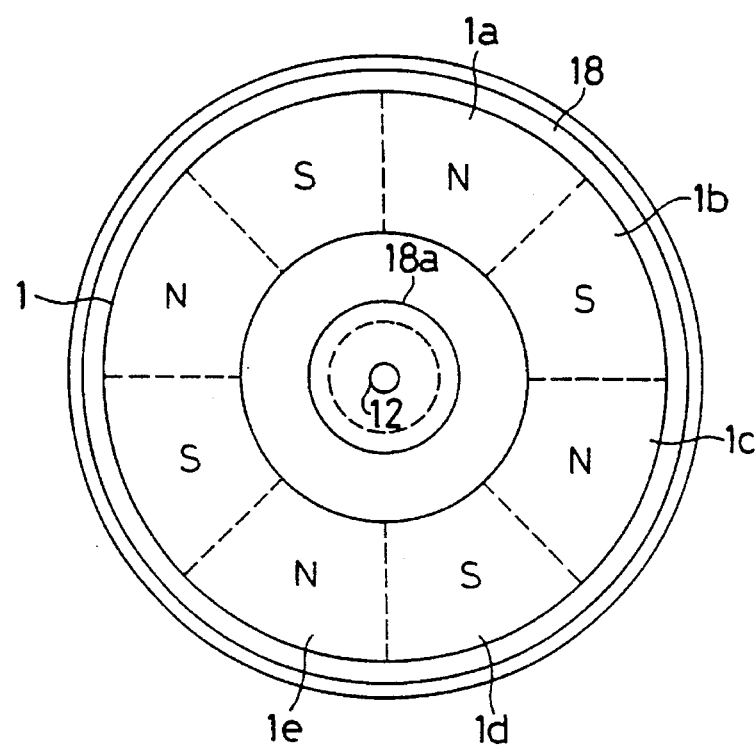
FIG. 15 is a plan of a magnetic rotor.

FIG. 15 is an arrow J direction view on the said magnetic rotor shown in FIG. 7.

Eight magnetic poles $1a$, $1b$, . . . of equal shape are arranged regularly.

A metallic disk 18a support a mild steel disk 18 and is mounted on a shaft 12.

Referring back to FIG. 7, another ball bearing 13b is set in a central bore of a lower casing 14b made of mild steel and supports the shaft 12.

Both the flanges of the upper and the lower casings 14a, 14b are joined as shown in FIG. 7.

Next, we explain a stationary armature.

In FIG. 3, armature coils $2a$, $2b$, . . . are of equal fan-like shape and wound in an alignment type.

The space they occupy is maximum.

The terminals of the windings are not illustrated, but they are prepared actually and connected with the transistor bridge circuit 5 shown in FIG. 14 through a certain wiring.

The circumferential portions $2a$-2, $2b$-2, . . . of the armature coils have nothing to do with the production of a torque, so they are bent upward.

The bent portions are shown in $2a$-1, $2b$-1, $2c$-1.

The other armature coils are put under the same circumstances.

The included angle H constituted by each of the coil portions of the armature coils effective for producing a torque exceeds 180 degrees.

It is (180+60) degrees in this working example.

According to a conventional means, the direction of the coil portion of the armature coil effective for producing a torque is radial as shown in a broken line B or C in FIG. 3.

In such a structure, the profile of the armature coil is shown in broken lines 2c-3 and the width of the coil is shown in F.

In this working example, the width of the coil is shown in E and the number of the windings is nearly two times more than that in a conventional means.

Therefore the copper loss is reduced and the output torque is increased.

It is an action of this invention.

On the other hand, the outside surfaces of each two adjacent armature coils are kept in contact with each other, so they can be arranged easily.

The coil portion effective for producing a torque tilts by 10 degrees of the radial direction shown by a broken line B or C, so the torque is reduced a little, but it is no problem because the torque reduction is negligibly small.

The armature coil of the shape 2c-3 shown in broken lines mentioned above may be adopted in this invention.

This may be applied to a motor of a small output torque.

On the other hand the armature coil may be wound in an ordinary type instead of being wound in an alignment type.

When the circumferential portions of coils 2a-2, 2a-3, ... shown in broken lines are bent upward, it is easy to wind them in an ordinary type.

An annular armature with elements 20, 21 buried in it shaped by a plastic injection machine is fixed to the upper surface of the lower casing 14b in FIG. 7.

Dotted portions represent plastic.

The element 20 represents the armature coils 2a, 2b, ... mentioned above in FIG. 3, and the element 21 represents the magnetic part or element or magnetic body or core to which the part 1 is attached.

Plastic is injected into a mold including the elements 20, 21 by an injection machine.

As a result the annular armature 22 is completed.

Such an annular armature 22 is fixed to the upper surface of the lower casing 14b.

The circumferential portions of the armature coils 2a, 2b, ... are not bent and extend radially as shown in broken lines 2a-2, 2b-2, ....

The whole armature coils are flat.

The magnetic core 21 is put in a magnetic path of the magnetic flux of poles 1a, 1b, ... of the magnet 1, so the magnetic flux of the magnet 1 closes its own path at the magnetic core 21 penetrating the armature coil.

The rotation of the shaft 12 with the disk 18 and the magnet 1 causes an iron loss in the magnetic core 21.

A well-known means of laminating a silicon steel plate on a certain material can not be adopted from the standpoint of constitution, so the following means may be used in this invention.

A silicon steel plate used for the magnetic core of a motor is 0.5 mm in thickness in general, but in this invention it is rolled further until its thickness reaches about a tenth of the initial thickness, namely nearly 50 microns, and then coiled spirally like a roll with adhesive agent coated on its surface.

After the adhesive is dried, the roll is cut in plural rings of a certain thickness resulting in annular magnetic cores 21 one of which is shown in FIG. 5.

By using such a magnetic core 21, the iron loss is reduced to a hundredth of a conventional one of 0.5 mm in thickness, and the work of coiling the plate spirally is easy.

They are characteristics of this invention.

Therefore such a magnetic core 21 is the most suitable for a high output and high speed motor.

FIG. 8 is an arrow J direction view of the magnetic core 21 shown in FIG. 7 and shows a bore 21a.

A support 19 including a Hall element shown in FIG. 7 is fixed to the upper surface of the annular magnetic core assembly 22.

Three Hall elements are used here but only one of them is shown in FIG. 7.

The Hall elements are set face to face with the circumferential magnetic poles of the magnet 1 in which the phase and the number of N and S poles are the same with those of the field poles 2a, 2b, ... and detect the position of the poles.

The detection signals are converted into the electrical signals for the curves of the time chart shown in FIG. 2 through a well-known means.

Thus the output torque of the magnetic rotor including the magnet 1 shown in FIG. 7 is gained through the above-mentioned 3 phase transistor circuit and a 3 phase flat core-less direct-current motor is realized.

Its armature is flat and the volume ratio of the coil by the armature is large resulting in a high output torque and a high power efficiency.

It is an effect as well as an action of this invention.

In the case of a high output motor, the magnet 1 is large and the axial magnetic absorption force between the magnet 1 and the magnetic core 21 is large, so the life of a ball bearing 13b is short and its friction loss is large.

The following means is adopted to avoid this in this invention.

A metallic disk 23a is mounted on the shaft 12 and a mild steel disk 23 is fixed to it. An annular magnet 24 is attached to the upper surface of the mild steel disk 23.

The upper surface of the magnet 24 is magnetized in N pole uniformly and the lower surface in S pole uniformly.

The upper surface of the magnet 24 faces the lower surface of the lower casing 14b with a gap therebetween, so the magnetic path is enclosed by the mild steel disk 23, its adjacent portions and the lower casing 14b and a strong absorption force produced in the opposite direction cancels the above-mentioned axial force acting on the ball bearing 13b.

The magnetic flux of the magnet 24 penetrates the lower casing 14b made of mild steel and does not change during rotation resulting in no iron loss and no torque loss.

Therefore this invention can solve the above-mentioned problem.

Next, we explain another working example shown in FIG. 16 below.

In this working example, the mild steel disk 23, the magnet 24, the upper casing 14a and the lower casing 14b shown in FIG. 7 are removed.

Therefore this type can not be adopted to a high output torque motor, but this is suitable for a low torque and high speed motor.

The structure of this type is simple and may be used for a flat motor.

Figure 16:
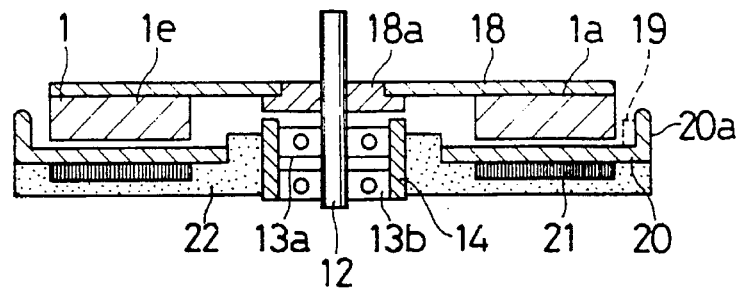
FIG. 16 is a sectional view of another working example of this invention.

In FIG. 16, a shaft 12, a metallic disk 18a, a mild steel disk 18 and a magnet 1 are the same with the parts of the same numbers shown in FIG. 7 and constitute a magnetic rotor.

Armature coils 20 correspond to the armatures 2a, 2b, . . . shown in FIG. 3.

The upward projections 20a of their circumferential portions correspond to the circumferential bent portions of the armature coils 2a-1, 2b-1, . . . shown in FIG. 3.

A part or element or magnetic body or magnetic core 21 functioning as a magnetic core is a thin silicon steel plate coiled spirally like that shown in FIG. 7.

Plastic is injected in a mold including the part or element or magnetic body or magnetic core 21 and the armature coils by an injection machine.

Thus an annular stationary armature 22 is completed.

Dotted parts in FIG. 16 represent plastic.

A metallic cylinder 14 inside which ball bearings 13a, 13b are set is buried in the central portion of the stationary armature 22.

A shaft 12 is supported by the ball bearings 13a, 13b so that it may rotate freely.

A downward magnetic thrust of the magnet 1 is born by the bearing.

Hall elements 19 used for detecting the positions of the poles correspond to the Hall element with the same number shown in FIG. 7.

The above-mentioned structure functions as a flat brushless core-less direct-current motor in which a magnetic rotor 18, 1 rotates through the energization of the armature coils as in FIG. 7.

The iron loss of the part or element or magnetic body or magnetic core 21 is remarkably small, so the speed and the power efficiency of the motor is high.

It is an effect as well as an action of this invention.

In the working examples shown in FIG. 7 and FIG. 16, the motor includes 6 armature coils as shown in FIG. 3, but it may include 3 armature coils less than 6.

In this example its output torque is reduced, but its structure is simplified.

Therefore it can be used effectively as a low output small sized motor.

Next, we explain FIG. 14 below.

A magnetic rotor 1 includes 2 N poles and 2 S poles.

Therefore the poles and the armature coils on the right side of a broken line D are removed, that is to say, it includes 3 armature coils 2a, 2b, 2c which are connected in a star connection.

The arrangement of the armature coils shown in FIG. 3 is modified, and the included angle constituted by each of the fan-shaped armature coils 2a, 2b, 2c is 90 degrees in mechanical angle or 180 degrees in electrical angle.

The magnetic rotor shown in FIG. 15 also includes 4 poles.

The included angle constituted by each magnetic pole is 90 degrees in mechanical angle.

The constitution of a magnetic rotor and a stationary armature is the same with that shown in FIG. 7 or FIG. 16, so this can fulfill the purpose of this invention.

The above-mentioned working examples relate to a 3 phase direct-current motor, but the technology of this invention can be applied to a 1 phase or 2 phase brushless core-less direct-current motor.

In the case of a 1 phase motor, a magnetic rotor includes 2 N poles and 2 S poles, 4 armature coils each of which constitutes an included angle of 90 degrees respectively are arranged at radially symmetrical positions respectively and a stationary armature consists of those armature coils, the magnetic body 21 shown in FIG. 8 which is attached to one side surfaces of them and plastic charged in a space necessary for constituting the said stationary armature for example.

Thus the constitution of a magnetic rotor and a stationary armature as shown in FIG. 16 can fulfill the purpose of this invention.

FIG. 14 is a developed view of a magnetic rotor and armature coils which constitute a 3 phase flat brushless core-less direct-current motor.

The magnetic rotor 1 includes 4 N poles 1a, 1c, . . . and 4 S poles 1b, 1d . . . .

Armature coils 2a, 2g shown in a broken line, and 2b represent the first, the second and the third phase armature coils respectively, but in this invention, the armature coil 2g is replaced by another armature coil 2c of the same phase on the right side.

An armature coil 2f is put under quite the same circumstances.

Thus the armature coils 2a, 2d are the first phase ones, the armature coils 2c, 2f are the second phase ones and the armature coils 2b, 2e are the third phase ones.

Each two armature coils of the first, the second and the third phases may be connected with each other in either of series and parallel.

The connection type of this working example is a star connection.

The included angle constituted by each of the conductive portions of the armature coils 2a, 2b, . . . effective for producing a torque is 180 degrees and that of each magnetic pole 1a, 1b, . . . is also 180 degrees.

They are arranged at regular pitches of 60 degrees.

In the case of a brushless direct-current motor, Hall elements are used for detecting the positions of the field magnet poles during rotation using the Hall elements and a well-known means converts the detection signals into the electrical signals necessary for a time chart.

Figure 17:
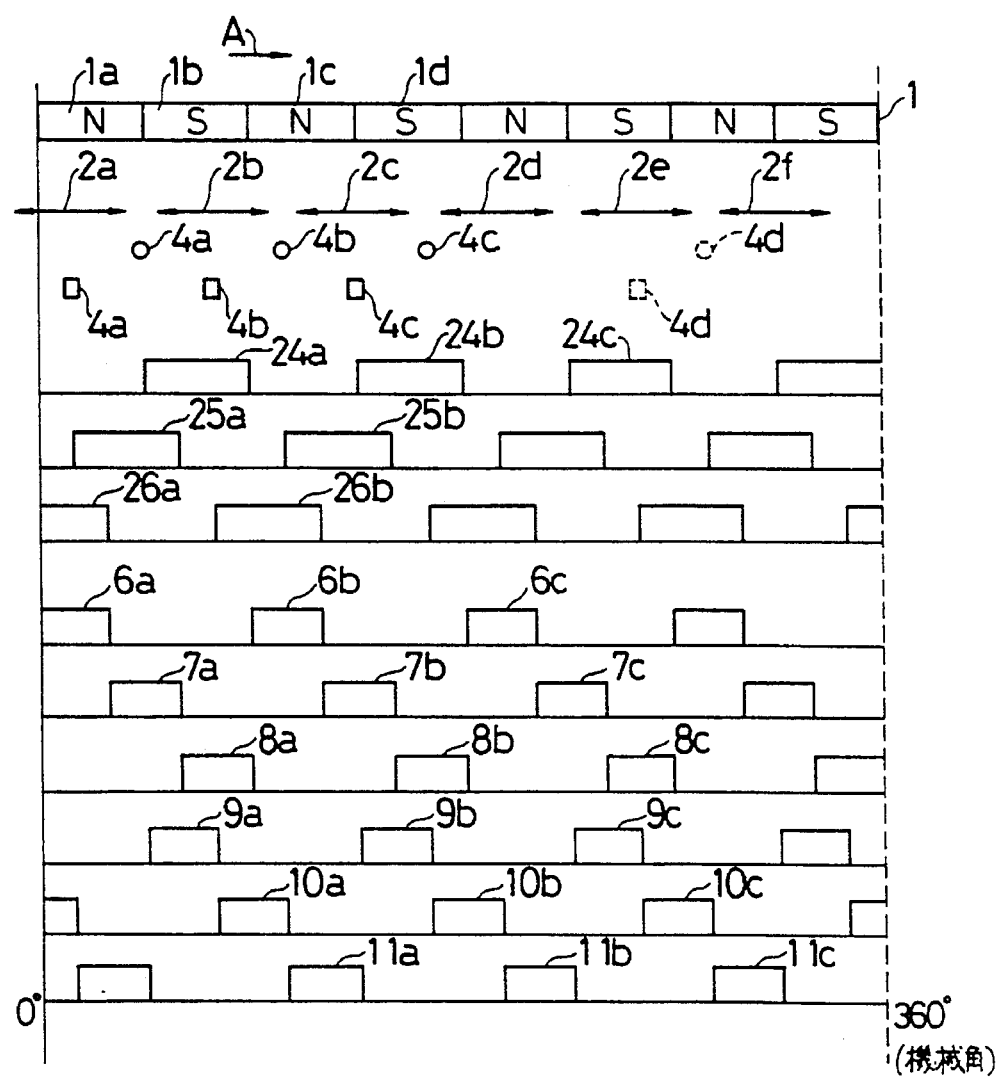
FIG. 17 is a time chart on position detection signals.

FIG. 17 shows a time chart mentioned above which is made based on the detection signals.

The lengths of curves 6a, 6b, . . . are 120 degrees and they are at intervals of 360 degrees.

The phase of curves 7a, 7b, . . . is 120 degrees late for that of curves 6a, 6b, . . . in turn and the phase of curves 8a, 8b, . . . is 120 degrees late for that of curves 7a, 7b, . . . in turn.

The phase of curves 9a, 9b, . . . is 180 degrees late for that of curves 6a, 6b, . . . in turn.

That of curves 10a, 10b, . . . is 120 degrees late for that of curves 9a, 9b, . . . in turn and that of curves 11a, 11b, . . . is 120 degrees late for that of curves 10a, 10b, . . . in turn.

Through a well-known 3 phase transistor bridge circuit, the armature coils 2a, 2d are energized back and forth corresponding to curves 6a, 6b, . . . and curves 9a, 9b, . . . respectively.

The armature coils 2c, 2f are energized back and forth corresponding to curves 7a, 7b, . . . and curves 10a, 10b, . . . and the armature coils 2b, 2e corresponding to curves 8a, 8b, . . . and curves 11a, 11b, . . . likewise.

Thus the field magnet 1 rotates functioning as a brushless direct-current motor.

The length of each pole position signal shown in FIG. 17 is 120 degrees, so each armature coil shown in FIG. 14 is energized by 120 degrees corresponding to this.

A rectangular part 5 shown in FIG. 14 represents a 3 phase star connection type well-known transistor bridge circuit used for the energization of the armature coils mentioned above.

Although any hole element is not illustrated, 3 Hall elements are used practically to detect the positions of the magnetic poles of magnetic rotor 1.

Figure 18:
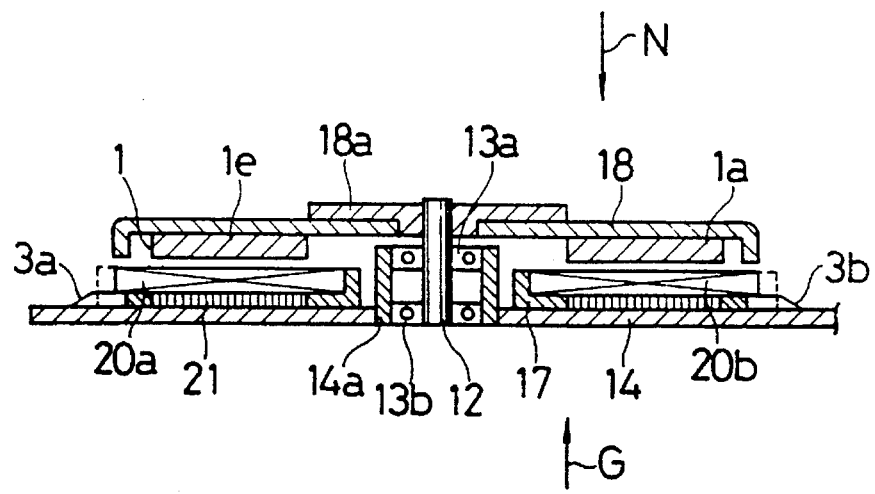
FIG. 18 is a sectional view of another working example of this invention.

Next, we explain the structure shown in FIG. 18 in detail.

FIG. 18 is a double scaled view showing a portion of a printed steel board with a wiring on its upper surface.

A part including a control circuit for the energization of the armature coil is omitted from FIG. 18 though it is used.

A metallic cylinder 14a is fixed to the central bore of the board 14.

Ball bearings 13a, 13b which are set in the metallic cylinder 14 support a shaft 12 so that it may rotate freely.

A metallic disk 18a is mounted on the upper end of the shaft and a mild steel disk 18 is fixed to the metallic disk 18a as shown in FIG. 18.

The upper surface of an annular magnet 1 including magnetic poles 1a, 1e is fixed to the rear surface of mild steel disk 18 constituting a magnetic path.

Figure 20:
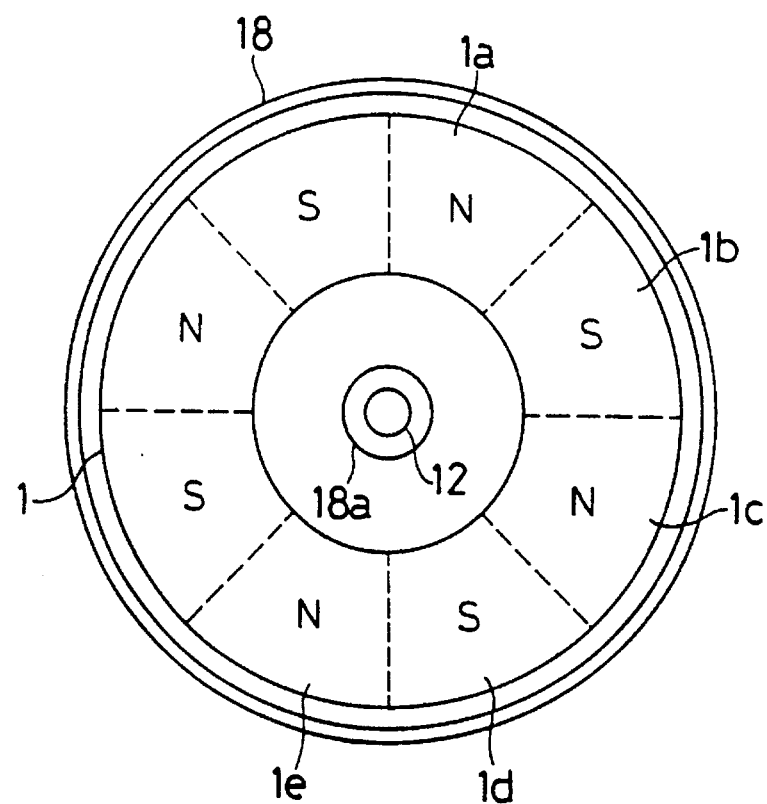
FIG. 20 is a plan of a magnetic rotor.

FIG. 20 is an arrow G direction view plan of a magnetic rotor 1 shown in FIG. 18 and shows 4 N poles and 4 S poles.

The included angles constituted by these poles 1a, 1b, . . . are 180 degrees.

Next, we explain a stationary armature coil.

In FIG. 3, armature coils 2a, 2b, . . . are fan-shaped ones of equal shape which are wound on alignment.

The space the winding occupies is maximum.

The winding terminals which are not illustrated are used for the connection of the windings with the transistor bridge circuit 5 shown in FIG. 14.

The circumferential portions of the windings 2a-2, 2b-2, . . . have nothing to do with the production of a torque and bent upward as occasion demands.

The bent portions 2a-1, 2b-1 are shown in FIG. 3.

Other armature coils are put under the same circumstances.

The included angle shown in H constituted by each of the coil portions effective for producing a torque exceeds 180 degrees and is (180+60) degrees in this working example.

In a conventional means, the direction of the coil portion of the armature coil effective for producing a torque is radial as shown in broken lines B, C.

According to such a means, the armature coil is shown in broken lines 2c-3 and its thickness is shown in F.

On the other hand, according to this working example, the thickness of the coil is E and the number of its winding is about two times more than that of the conventional one.

Therefore the copper loss is reduced and the output torque is increased.

It is an action of this invention.

The outside surfaces of each two adjacent armature coils are in contact with each other, so it is easy to arrange them.

The coil portions effective for producing a torque tilt by 10 degrees from a radial direction shown in a broken line B or C and the torque is reduced a little, but there is no problem because its reduction is negligibly small.

The above-mentioned armature coil of a shape shown in broken line 2c-3 may be adopted in this invention, but it should be applied to a low output torque motor.

On the other hand, the winding of the armature coil may be an ordinary type one instead of an alignment type one.

It is ideal that the included angle constituted by the coil portion of the armature coil is the same with that constituted by the magnetic pole, but in order to increase a torque, the former may as well be a little more than the latter.

As a result, the former may be nearly equal to the latter in this invention.

A magnetic body 21 made of silicon steel rolled thinly and coiled spirally shown in FIG. 18 is described later in detail.

Armature coils 20a, 20b shown in FIG. 3 are attached to the upper surface of the magnetic body 21.

A stationary armature 17 is constituted by them and plastic charged into the space necessary for the shape of the stationary armature 17 and of annular shape.

Before shaping by the medium of plastic wiring between each armature coil and a commutator 4 shown in FIG. 1 is finished.

The input terminal of the transistor bridge circuit 5 is extended to the circumference of the armature body as shown in FIG. 18 and necessary wiring on the printed board is carried out.

The above-mentioned stationary armature 17 is fixed on the printed board 14 by adhesive.

Main portions 20a, 20b of the armature coils 17 are also shown in FIG. 18.

The magnetic body 21 functions as a magnetic path of the poles 1a, 1b, . . . of the magnet 1, so the magnetic flux of the magnet 1 penetrates the armature coils and closes its path at the magnetic body 21.

The rotation of the shaft 12 with the disk 18 and the magnet 1 causes the iron loss in the magnetic body 21.

A well-known means for laminating a silicon steel plate on a certain material can not be adopted from the standpoint of constitution, so the following means is used in this invention.

The thickness of a silicon steel plate used for a magnetic core of a motor is 0.5 mm in general, but in this invention, it is rolled further until its thickness reaches nearly a tenth of its initial thickness, namely about 50 microns.

Such a thin plate is coiled spirally and then cut by a cutter into plural rings of a certain thickness one of which is a magnetic body 21 shown in FIG. 18. the iron loss of such a magnetic body 21 is about a hundredth of that of conventional one of 0.5 mm in thickness.

It is easy to coil the plate spirally because it is thin.

They are strong points of this invention.

Therefore This is the most suitable as a magnetic body used for closing the magnetic path in a high output and high speed motor.

Figure 19:
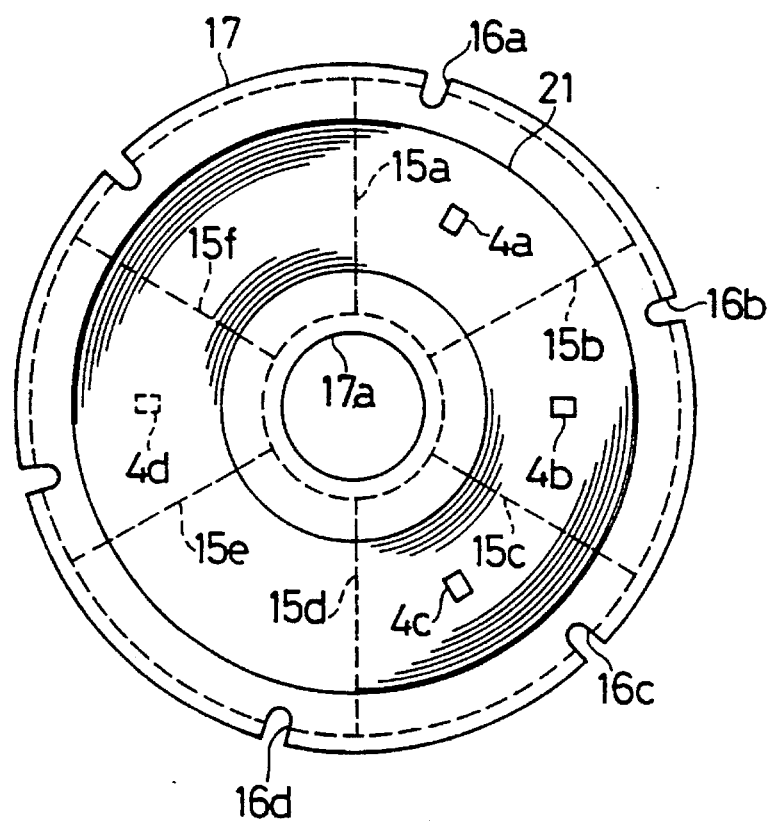
FIG. 19 is a plan of a stationary armature.

FIG. 19 is an arrow N direction view plan of a stationary armature 17 shown in FIG. 18.

The necessary wiring about a terminal of each armature coil along the inner surface of the stationary armature 17 is buried in plastic after the wiring is finished.

Armature coils 2a, 2b, . . . are set in six fan-shaped spaces shown in broken lines 15a, 15b, . . . in FIG. 19 respectively.

The rear surfaces of the armature coils are fixed to the front surface of the magnetic body 21 by adhesive.

The front surfaces of the armature coils are coated with plastic film of about 0.2 mm in thickness.

The concave portions 16a, 16b, . . . shown in FIG. 19 make spaces necessary for wiring among the terminals 3a, 3b lead outside from the armature coils and a commutator.

Next we explain below a means for arranging on a stationary armature hole elements used for detecting the pole position of the magnet rotor during rotation.

In this working example, Hall elements 4a, 4b, 4c are fixed to the central portions of the upper surfaces of the armature coils, but the wiring works of 4 leads of 4 Hall elements are troublesome in such a means.

In order to obstruct this trouble, the Hall elements may be set near the circumference between two adjacent armature coils.

This is described later in detail.

In a time chart shown in FIG. 17, the magnetic rotor 1 rotates in an arrow A direction at a certain speed.

Arrows 2a, 2b, . . . shows the breadth of each armature coil and the position to which each is fixed.

Each arrow length is equal to the breadth of each pole 1a, 1b, . . . and each interval angle is 60 degrees.

Three Hall elements shown in rectangles 4a, 4b, 4c are fixed to the central portions of the armature coils 2a, 2b, 2c.

The Hall elements shown in circles 4a, 4b, 4c are set on the productions of the contact lines of the two adjacent armature coils.

When the magnetic rotor 1 rotates in an arrow A direction, the output curve of the N pole of the Hall element 4c shown in a rectangle is shown in 24a, 24b, . . . , that of the Hall element 4b shown in another rectangle is shown in 26a, 26b, . . . and that of Hall element 4a shown in the last rectangle is shown in 25a, 25b, . . . .

The output curves of the Hall elements 4a, 4b, 4c shown in circles are shown in the group 24a, 24b, . . . , the group 25a, 25b, . . . and the group 26a, 26b, . . . respectively.

Curves 6a, 6b, . . . come from an AND-circuit which adds the curves 26a, 26b, . . . to the reversed curves of the curves 24a, 24b, . . . Curves 7a, 7b, . . . , curves 8a, 8b, . . . , curves 9a, 9b, . . . , curves 10a, 10b, . . . , and curves 11a, 11b, . . . also come from the AND-circuit after the similar calculation.

The armature coils are energized back and forth by 120 degrees as mentioned above through the above output curves of 6 systems. Thus a torque for driving a 3 phase star-connected direct-current motor is produced.

Even if a Hall element is set at a position 4d instead of a position 4b, the action and the effect are the same.

As clarified from the above explanation, the magnetic flux of the magnetic rotor 1 closes its own path at the magnetic body 21, so the output torque is increased and iron loss is reduced to a hundredth of the conventional type.

As a result, a motor of high power efficiency and high speed of about 20,000 rpm is realized.

It is an effect as well as an action of this invention.

As understood from a constitution shown in FIG. 18, a flat motor suitable for a mass production is realized.

It is a strong point of this invention.

When a flexible disk or a hard disk is set on a mild steel disk 18 shown in FIG. 18, a flat driver can be made.

On the other hand, when a laser mirror is set on it, a high speed and flat laser mirror device can be obtained.

Figure 21:
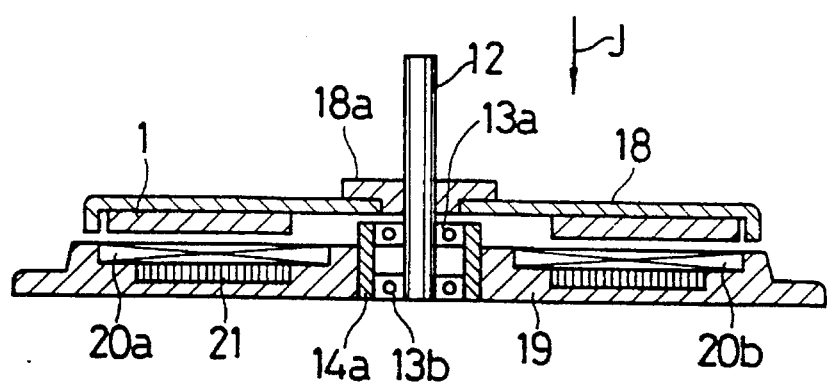
FIG. 21 is a sectional view of another working example of this invention.

FIG. 21 shows another working example including 4 magnetic rotor poles and 3 stationary armature coils.

By means of this working example, a motor can be smaller than that shown in FIG. 18.

In this working example, a right half portion of the developed view of the armature arrangement shown in FIG. 14 is removed.

In FIG. 21, a magnetic rotor 1 includes 2 H poles and 2 S poles.

It is mounted on a shaft 12 which is supported by ball bearings 13a, 13b so that it may rotate freely.

A motor including 3 armature coils, 4 magnetic poles and a stationary armature whose constitution is the same with that shown in FIG. 18 may fulfill the purpose of this invention.

In this working example, the constitution of the stationary armature is unique.

We explain it below in detail. The constitution of the flat magnetic body 21 coiled spirally is the same with that shown in FIG. 18.

Figure 22:
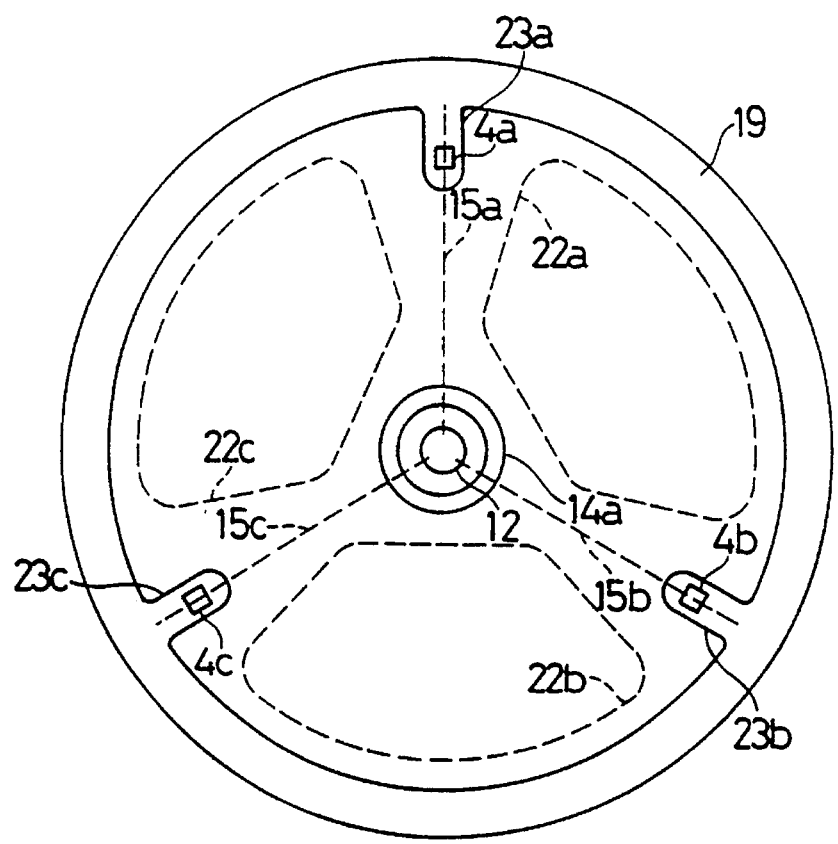
FIG. 22 is a plan of a stationary armature on a working example shown in FIG. 21.

FIG. 22 is an arrow J direction view plan of a stationary armature shown in FIG. 21.

Fan-shaped armature coils 22a, 22b, 22c as shown in broken lines are fixed to the magnetic body 21.

They correspond to the armature coils 2a, 2b, 2c shown in FIG. 14.

The breadths of the armature coils 22a, 22b, 22c are nearly equal to the breadth of the field magnet.

They are arranged at equal pitch. The included angle constituted by each two of broken lines 15a, 15b, 15c is 120 degrees in mechanical angle.

A stationary armature 19 is constituted by armature coils 20a, 20b, a magnetic body 21, a metallic cylinder 14a shown in FIG. 21 and plastic charged into the space necessary for forming the stationary armature.

The metallic cylinder 14a in which ball bearing 13a, 13b are set is buried in the central portion of the stationary armature 19.

The Hall elements 4a, 4b, 4c for detecting the pole positions of the magnetic rotor 1 are fixed inside the concave portions 23a, 23b, 23c arranged at equal intervals near the circumference of the stationary armature 19 and in addition at the contact lines of adjacent two armature coils shown in broken lines 15a, 15b, 15c and are used for detecting the pole positions of the magnetic rotor 1.

As described referring to FIG. 17, the armature coils 22a, 22b, 22c are energized back and forth by 120 degrees and a high torque for driving a 3 phase star-connected high speed motor can be produced.

Therefore this can fulfill the purpose of this invention.

Even if the number of the armature coils is six instead of three as shown in FIG. 22, it can fulfill the purpose of this invention.

Generally speaking, when the number of the magnetic poles of the magnetic rotor is shown in 2n where n is even number, the number of the armature coils may be $\frac{3}{2} \times N$ to fulfill the purpose of this invention.

Before the armature coils and the magnetic body 21 are shaped by an plastic injection machine, necessary wiring work inside the armature coils may be finished and 3 terminals of the armature coils may be lead to the circumferential portions of the stationary armature to facilitate the connections of them with the other terminals like previous working example.

Next, we explain a concrete means for making a magnetic body below.

The dimensions of a thin silicon steel plate used here are 25 cm in breadth and nearly 0.1 mm or less in thickness.

The insulation film coated on the front and the rear surfaces of the magnetic body 21 are 1.5 microns in thickness.

Figure 23:
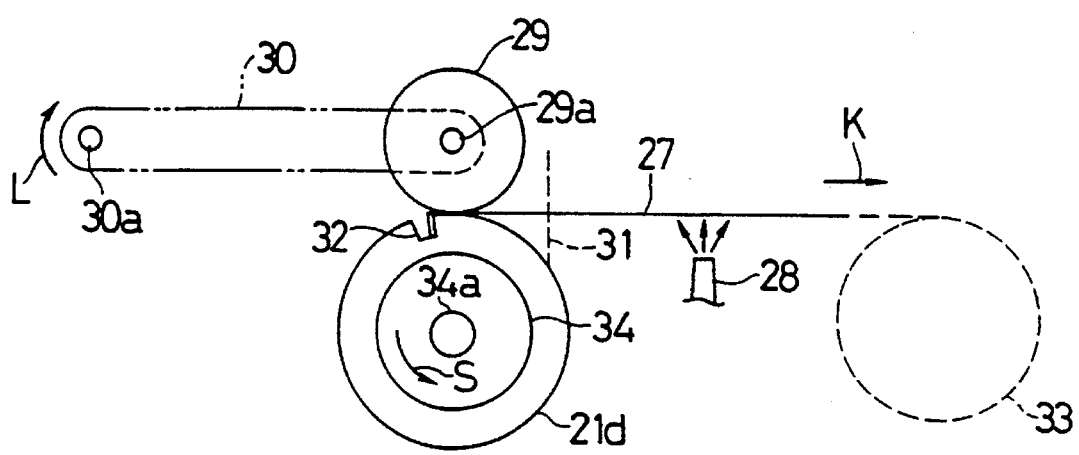
FIG. 23 is a drawing for explanation of an apparatus by which a silicon steel plate is coiled spirally.

In FIG. 23, a thin silicon steel plate coiled as mentioned above is shown in a broken line 33.

A certain tension acts on it in an arrow K direction.

In FIG. 23, a roll 34 whose ends are shafts 34a supported by bearings so as to rotate freely is put in a plastic cylinder 21d.

It is driven by a motor, not illustrated, and rotates in an arrow S direction.

A shaft 30a of a lever 30 is supported by bearings so that it may rotate freely.

A spring force acts on the lever so that it may turn in an arrow L direction, so a roller 29 set at a free end of the lever is kept in pressed contact with the outer surface of the cylinder 21d.

The roller 29 is supported by a shaft 29a of the lever 30 so that it may rotate freely.

There is a groove 32 in the longitudinal way on the outer surface of the cylinder 21d.

Figure 24:
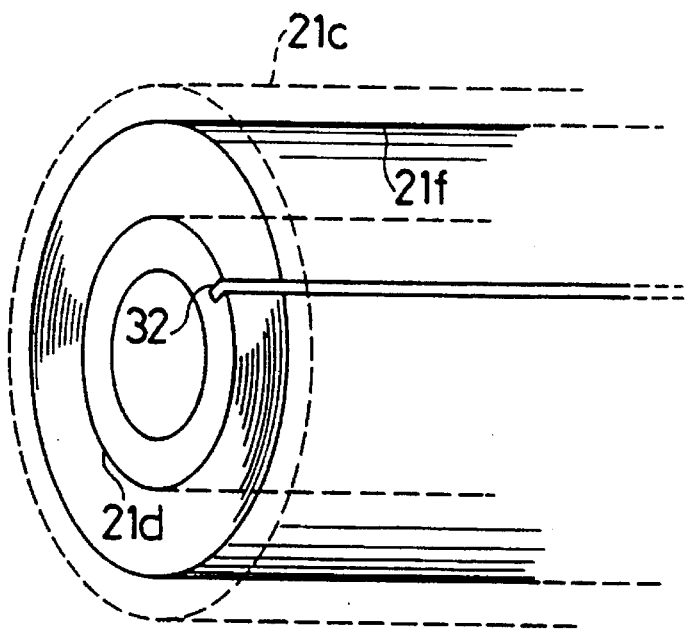
FIG. 24 is a perspective view of a coiled silicon steel plate made by an apparatus shown in FIG. 23.

The groove 32 is also shown in FIG. 24.

A thin silicon steel plate 27 (hereinafter called "steel plate" simply) is drawn from a steel plate roll 33 and its end is bent so that it may be fit in the groove 32.

It is fixed to the groove by adhesive.

The roller 29 presses the steel plate against the cylinder as shown in FIG. 23.

Thermosetting adhesive liquid is sprayed through a nozzle 28 against the rear surface of the steel plate 27 moving leftward.

The roller 29 is heated to a certain temperature by induction heating.

The steel plate 27 is coiled again by the rotating cylinder 34.

It is pressed and heated by the roller 29 hereat, so it is fixed to the cylinder.

When the cylinder 34 rotates by a certain turns, the motor driving the cylinder 34 is stopped.

Just before the motor is stopped, a cutter is put on a broken line 31 shown in FIG. 23 and cuts the steel plate 27.

Thus the steel plate 27 is coiled round the plastic cylinder 21d and the adhesive is hardened by heating resulting in fixing the steel plate roll to the cylinder.

When pressure-setting adhesive liquid is sprayed, it is unnecessary to heat the roller 29.

Next, the cylinder 21d with the coiled plate round it is drawn out of the roll 34 and it is covered by plastic charged into a metal mold including it by means of a plastic injection machine.

This plastic cover cylinder is shown in a broken lined cylinder 21c in FIG. 24.

After all triple cylinders are shown in FIG. 24.

The most inside cylinder is a plastic one 21d, the intermediate cylinder is a steel plate coil 21f and the most outside cylinder is another plastic one.

The above triple cylinders are cut into plural rings of about 1 mm in thickness by a diamond cutter.

Figure 25:
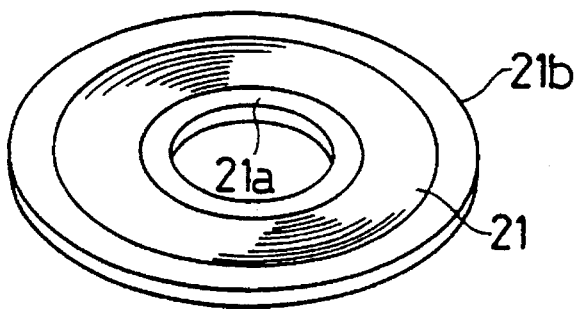
FIG. 25 is a perspective view of a magnetic body 21.

Thus a magnetic body 21 shown in FIG. 25 is completed.

Triple rings 21a, 21, 21b shown in FIG. 25 correspond to the triple cylinders 21d, 21f, 21c respectively shown in FIG. 24 which will be cut. Such three layer rings may be used as a magnetic body 21 shown in FIG. 18 or FIG. 21.

FIG. 14 is a developed view of the armature coils and the magnetic rotor functioning as a magnetic field of a 3 phase flat brushless and core-less direct-current motor.

The magnetic rotor 1 consists of 4 N poles 1a, 1c, ... and 4 S poles 1b, 1d, ....

Three armature coils 2a, 2g (shown in a broken line) and 2b represent the first, the second and the third phase armature coils.

In this invention, the armature coil 2g is replaced by an armature coil 2c on the right side for convenience' sake.

The armature coil 2f is put under quite the same circumstances.

Therefore the armature coils 2a, 2d are the first phase ones, the armature coils 2c, 2f are the second phase ones and the armature coils 2b, 2e are the third phase ones.

Each two of the first, the second and the third phase armature coils may be connected with each other in either of series and parallel.

The connection type of this working example is a star connection.

The included angle constituted by each of the conductive portions of the armature coils 2a, 2b, ... effective for producing a torque is 180 degrees which is the same with that constituted by magnetic poles 1a, 1b, ....

They are set at intervals of 60 degrees.

In the case of a brushless direct-current motor, hole elements is used to detect the positions of poles of a rotating field magnet and a well-known means is used to convert the detection signals into electrical signals necessary for a time chart.

The time chart related to those signals shown in FIG. 17 is the same with that explained above, so a repeated explanation shall be omitted.

Next, we explain the structure of another working example below in detail referring to FIG. 26.

Figure 26:
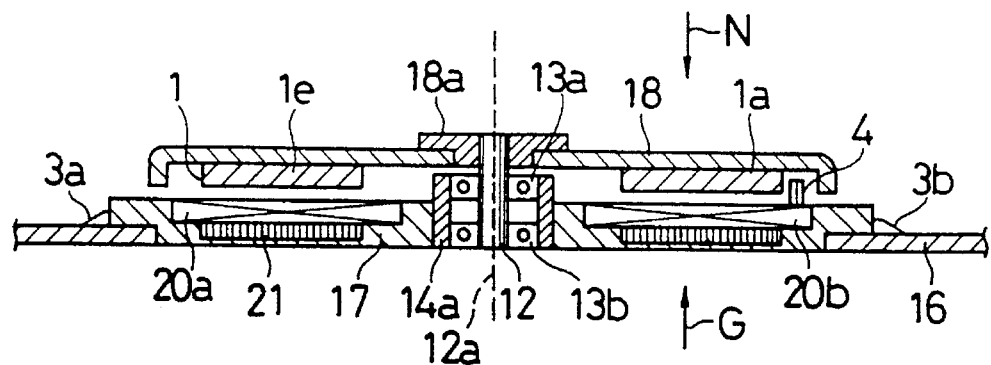
FIG. 26 is a sectional view of another working example of this invention.

FIG. 26 is a double scaled view.

A portion of a printed steel board 16 is shown in FIG. 26.

A wiring and parts for an energization control circuit which are not shown in FIG. 26 are set on its upper surface.

The upper surface of an annular magnet 1 including magnetic poles 1a, 1e is fixed to the rear surface of a mild steel disk 18 constituting a magnetic path.

Figure 28:
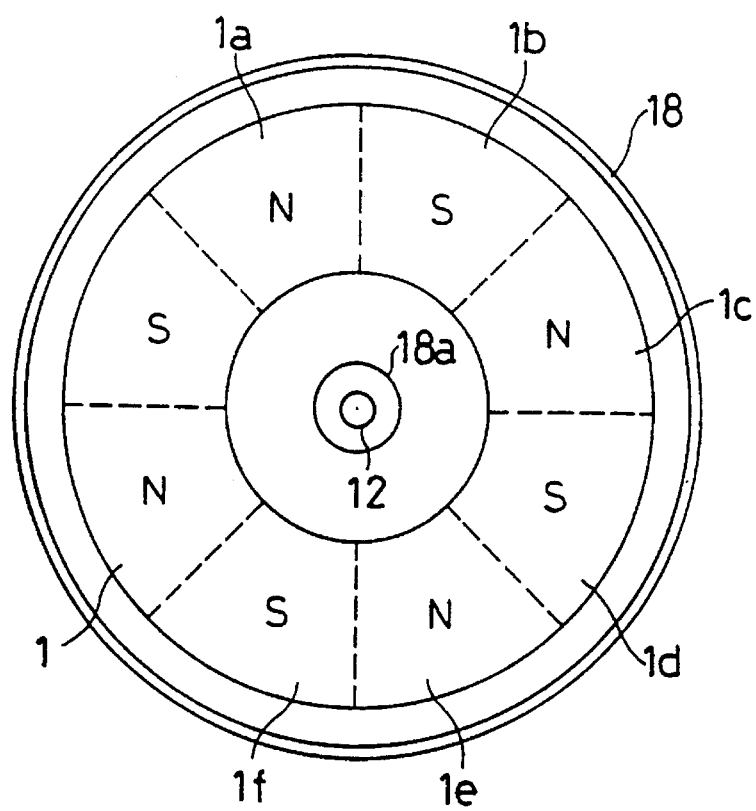
FIG. 28 is a plan of a magnetic rotor.

FIG. 28 is an arrow G direction view of a magnetic rotor 1 shown in FIG. 26.

It includes 4 N poles 1a, 1c, ... and 4 S poles 1b, 1d, ....

The included angle constituted by them is 180 degrees. In FIG. 26, a metallic disk 18a which is mounted on a shaft 12 is fixed to the central portion of the mild steel disk 18.

Armature coils 20a, 20b are also shown in FIG. 26.

Figure 27:
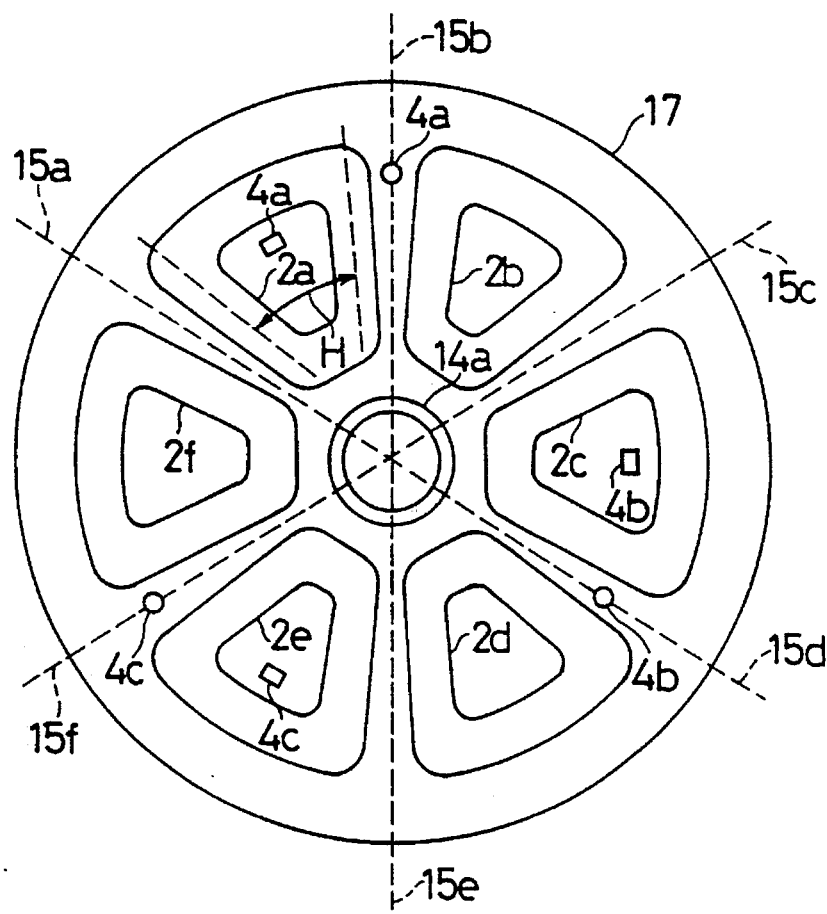
FIG. 27 is a plan of a stationary armature.

We explain them in detail referring to FIG. 27 which is an arrow N direction view of them shown in FIG. 26.

Armature coils 2a, 2b, ... are fan-shaped ones of equal shape and the space their windings occupy is maximum.

Their terminals which are not shown in FIG. 27 are connected with a transistor bridge circuit 5 shown in FIG. 14.

The included angle constituted by each of the coil portions effective for producing a torque shown in H is 180 degrees.

An angle between each two adjacent broken lines is 60 degrees in mechanical angle.

A stationary armature 17 comprising armature coils, annular magnets 21 and a metallic cylinder 14a buried in it and plastic charged into the space necessary for forming the stationary armature is shown in FIG. 27.

An annular magnet 21 made of silicon steel rolled thinly and coiled spirally shown in FIG. 26 is described later in detail.

Armature coils 20a, 20b are fixed to the upper surface of the annular magnet 21 by means of adhesive.

Plastic is charged into a metal mold including both to make a stationary armature 17 by an injection machine.

Before plastic is charged, the wiring work related to the armature coils as shown in FIG. 14 is finished and the input terminals 3a, 3b of a transistor bridge circuit 5 which are lead out are connected with a printed board 16 on which the transistor bridge circuits is loaded.

Ball bearings 13a, 13b are set in the metallic cylinder 14a and support a shaft 12 so that it may rotate freely.

A field magnet 1 of a magnetic rotor faces the armature coils 20a, 20b with a gap therebetween.

The necessary wiring related to the armature coils is in side a thin plastic layer, not illustrated, on the armature coil surface.

The terminals 3a, 3b of the wiring are shown in FIG. 26.

A short downward projection of a disk-shaped stationary armature 17 including plastic is inserted into the bore of the printed board 16 and fixed to it.

Necessary chips which are elements for a circuit and wirings are arranged on the printed board 16.

Divided N and S poles distributed along the circumference of the field magnet 1 are magnetized and Hall elements 4 are set face to face with them on the stationary armature 17.

The frequency of the output signal of the Hall element is proportional to the speed.

Therefore a well-known type FG servomechanism is used to set the speed at a certain value.

A flexible disk is set on the metallic disks 18, 18a through a well-known means.

A magnetic body 21 constitutes a magnetic path of the magnetic flux of the poles 1a, 1b, . . . , so the magnetic flux of the magnet 1 penetrates the armature coils and the magnetic path closes at the magnetic body 21.

The rotation of the shaft 12 with the mild steel disk 18 and the magnet 1 causes an iron loss at the magnetic body 21.

A well-known means for laminating a thin silicon steel plate on a certain material can not be adopted from the view point of a constitution.

In this invention, the following means may be used.

The thickness of a silicon steel plate functioning as a magnetic core of a motor 0.5 mm in general.

In this invention, the silicon steel plate is rolled further until its thickness reaches a tenth of the initial thickness, namely about 50 microns.

Such a thinner silicon steel plate is coiled spirally. Next, the coil is cut into plural rings by a cutter.

As a result, the annular magnetic body 21 of a certain thickness which is shown in FIG. 26 is completed.

The iron loss of such a magnetic body 21 is reduced to a hundredth of a well-known one of 0.5 mm in thickness.

In addition, it is easy to coil a silicon steel plate spirally because it is thin.

This is a strong point of this invention.

Therefore this is the most desirable as a magnetic body at which a magnetic path closes inside a high output and high speed motor.

Next, we explain below a means for arranging on a stationary armature Hall elements which are used for detecting the pole position of a rotating magnetic rotor necessary for a torque control.

Three Hall elements 4a, 4b, 4c shown in square shapes in FIG. 27 are set at the intermediate positions of the stationary armature 21, but this means is accompanied by the difficulty of the wiring related to 4 leads of each Hall element.

In order to make the wiring easy, the Hall elements may be set near the circumference between the two adjacent armature coils.

We explain it later in detail.

The Hall element may be replaced by another kind of magnetism-electricity conversion element whose action is the same with that of the Hall element.

In a time chart shown in FIG. 17, a magnetic rotor 1 rotates in an arrow A direction with a certain speed.

Arrows 2a, 2b, . . . represent the breadths of the armature coils and their positions.

Their lengths are equal to the breadths of the magnetic poles.

They are arranged at intervals of 60 degrees.

The Hall elements 4a, 4b, 4c which are shown in a square shape in FIG. 27 are set at intermediate portions of the armature coils 2a, 2b, 2c.

The Hall elements which are shown in circles in FIG. 27 are set near the circumference between the two adjacent armature coils.

When a magnetic rotor 1 rotates in an arrow A direction, the output curves of N poles a square Hall element 4c obtains are represented by a group 24a, 24b, . . . .

Those another square Hall element 4b obtains are represented by another group 26a, 26b, . . . and those the last square Hall element 4a obtains the last group 25a, 25b, . . .

The output curves a circular Hall element 4a obtains are represented by a group 24a, 24b, . . . , those another circular Hall element 4b obtains by another group 25a, 25b, . . . and those the last circular Hall element 4c obtains by the last group 26a, 26b . . . .

Curves 6a, 6b, . . . are obtained as the outputs of an AND-circuit through which the reversed curves of the curves 24a, 24b, . . . are added to the curves 26a, 26b, . . .

Curves 7a, 7b, . . . , curves 8a, 8b, . . . , curves 9a, 9b, . . . , curves 10a, 10b, . . . and curves 11a, 11b, . . . are obtained through the similar calculations.

The armature coils are energized back and forth by 120 degrees as mentioned above through the above output curves of 6 systems.

Thus a torque for driving a 3 phase star-connected direct-current motor is produced.

Even if a Hall element 4b is set at a position 4d instead of a position 4b, the action is the same.

As clarified from the above description, the magnetic flux path of the magnetic rotor 1 closes at the magnetic body 21, so the output torque is increased and the iron loss is reduced to a hundredth of the conventional type.

As a result, A motor of high power efficiency and high speed of about 20,000 rpm is realized.

It is an effect as well as an action of this invention.

As understood from a constitution shown in FIG. 26, a flat motor suitable for a mass production is realized.

It is a strong point of this invention.

When a flexible disk or a hard disk is set on a mild steel disk 18 shown in FIG. 26, a flat driver can be made.

On the other hand, when a laser mirror is set on it, a high speed and flat laser mirror device can be obtained.

In FIG. 27, As the Hall elements 4a, 4b, 4c shown in circles are set on broken lines 15b, 15d, 15f of a stationary armature, it is easy to connect their terminals with the terminals of the printed board 16.

A motor with 4 field magnet poles in its magnetic rotor and 3 armature coils in it can also fulfill the purpose of this invention.

In the case of this motor, the developed view of the armature coils and field magnet poles corresponds to a left half of the developed view shown in FIG. 14.

Generally speaking, when the number of the magnetic poles of the magnetic rotor is 2n where n is even number, the number of the armature coil for working this invention is $\frac{3}{2} \times n$.

The included angle constituted by each of the coil portions of the armature coils effective for producing a torque shown in FIG. 27 is 45 degrees in mechanical angle.

When this angle is enlarged, the winding number of the armature coils can be increased.

This means can be used effectively for producing a larger output torque.

The maximum value of the above included angle is 60 degrees in mechanical angle.

Next, we explain a concrete means for making a magnetic body 21 below.

A thin silicon steel plate coiled spirally of 25 cm in breadth and about 0.1 mm or less in thickness whose front and rear insulation coatings are 1.5 microns in thickness respectively is used here.

Figure 33:
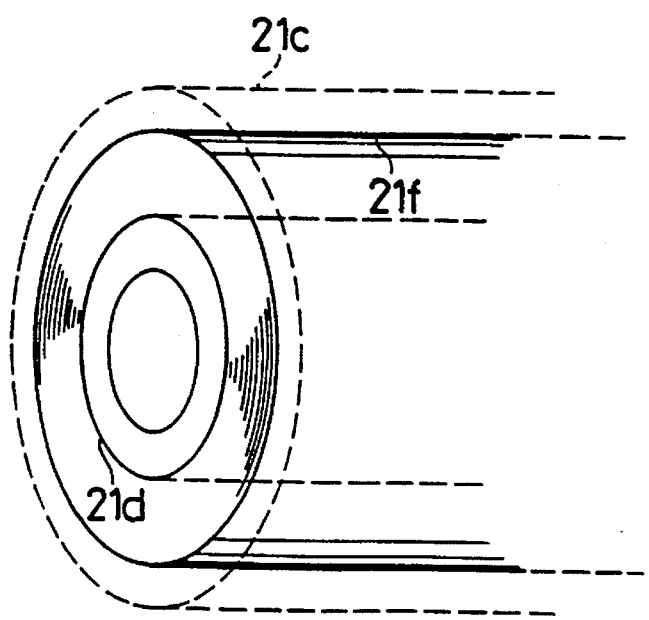
FIG. 33 is a perspective view of a coiled silicon steel plate.

In FIG. 33, the silicon steel plate mentioned above is coiled spirally round a plastic cylinder 21d.

Before it is coiled, adhesive is coated on it.

As a result, the multilayer plates constituting a steel roll 21f are fixed tightly to each other.

A plastic cylinder 21c is formed round the silicon steel plate roll by an injection machine.

These plastic and steel combination cylinders are cut into plural rings of about 1 mm in thickness by a diamond cutter.

Thus the magnetic ring 21 shown in FIG. 25 is completed.

The combination rings 21a, 21, 21b shown in FIG. 25 correspond to the combination cylinders 21d, 21f, 21c shown in FIG. 33 which will be cut into plural rings.

Such a ring can be used as a magnetic body 21 shown in FIG. 26.

The plastic ring 21a can prevent the shape of the silicon steel plate coiled spirally from being deformed when it is cut by a diamond cutter.

Figure 31:
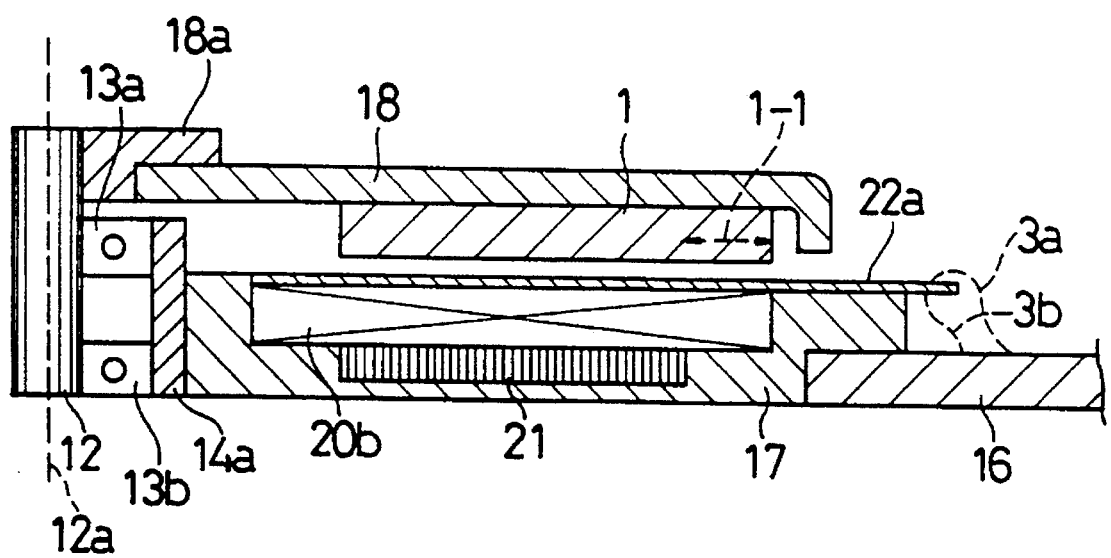
FIG. 31 is a sectional view of another working example of this invention.

FIG. 31 shows another working example of this invention and is a quadruplicated drawing.

It shows only a right half section of a motor which corresponds to a half section on the right of a broken central line shown in FIG. 26.

In FIG. 31, the action and the effect of a magnetic rotor fixed to a shaft 12 are the same with those of the magnetic rotor shown in FIG. 26.

The constitution of the armature coils 20b and the annular magnetic body 21 are also the same with that of the armature coils 20b and the annular magnetic body 21 shown in FIG. 26.

A stationary armature 17 is constituted by a metallic cylinder 14a, armature coils 20a, 20b, an annular magnetic body 21 and a printed plastic board 22a which are all buried in it and plastic charged into the space necessary for forming a stationary armature 17.

The stationary armature 17 is a disk-shaped one and its short downward projection is inserted into the central bore of a printed board 16 of a steel base and fixed to it.

The printed board 16 includes a control circuit for an armature coil enertgization, the other necessary elements and the wirings related to them.

Figure 29:
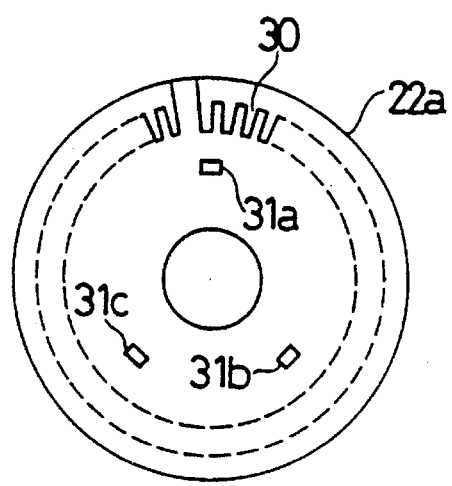

FIG. 29 is a plan of a printed board 22a.

The scale of FIG. 29 is a fourth of that of the printed board 22a shown in FIG. 31.

The upward surface of the printed board 22a which faces the field magnet poles of the magnetic rotor includes a zigzag wiring 30 whose both terminals are lead out as shown in FIG. 29.

The field magnet 1 which faces the wiring 30 on the printed board includes N and S poles whose widths shown in an arrow 1—1 in FIG. 31 are the same with the wiring width on the printed board.

They are distributed all over the circumference and magnetized.

when the magnetic rotor rotates, the induction output of a frequency proportional to a motor speed is obtained at the terminals and a well-known FG servomechanism circuit can control a motor under a constant speed using the induction output.

A synchronous constant speed control can be also adopted here if necessary.

The above-mentioned terminals of the printed board 22a are connected with input terminals of the printed board 16 by the medium of leads 3a, 3b shown in broken lines in FIG. 31 and the above induction output signal is transmitted to the printed board 16 to be used for a constant speed control.

There are 3 bores 31a, 31b, 31c distributed at intervals of 120 degrees in mechanical angle on the printed board 22a as shown in FIG. 29 and 3 Hall elements 4a, 4b, 4c shown in squares in FIG. 27 are inserted into the bores and fixed to it.

The stationary armature includes 3 concave portions at the positions corresponding to the bores 31a, 31b, 31c.

The terminals of the Hall elements 4a, 4b, 4c are connected with the wirings set on the rear surface of the printed board 22a.

The input terminals of the wirings are connected with the corresponding input terminals of the printed board 16 by the medium of the leads shown in broken lines 3a, 3b in FIG. 31.

The terminals of the armature coils are connected with the wirings on the rear surface of the printed board 22a before the stationary armature 17 are shaped by a plastic injection machine.

The terminals of the said wirings of the printed board 22a are connected with the corresponding input terminals of the wirings of the printed board 16 by the medium of the leads 3a, 3b.

As understood from the above explanation, the effect of this invention is to supply people with a flat motor suitable for a mass production.

A magnetic path of the field magnet 1 closes at the annular magnet 21, so a motor of a little iron loss, high speed, high power efficiency and high output torque is realized.

It is an effect as well as an action of this invention.

Next, we explain another working example of this invention below referring to FIG. 32.

Figure 32:
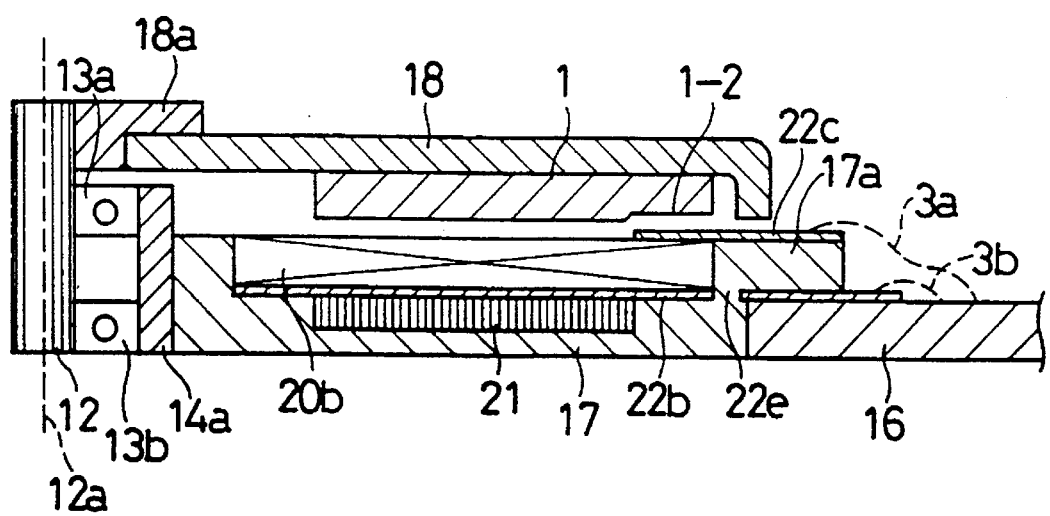
FIG. 32 is a sectional view of another working example of this invention.

Different parts of FIG. 32 from FIG. 31 are only printed boards 22b, 22c.

Therefore the explanation of parts other than printed boards shall be omitted.

A stationary armature 17 is constituted by armature coils 20a, 20b including an annular printed board 22b and an annular magnetic body 21 which are all buried in it and plastic charged into a space necessary for forming it by an injection machine.

Another annular printed board 22c is fixed to the upper circumferential surface of the stationary armature 17.

The downward short projection of the stationary armature is inserted into the central bore of another printed board 16 and fixed to it tightly.

Figure 30:
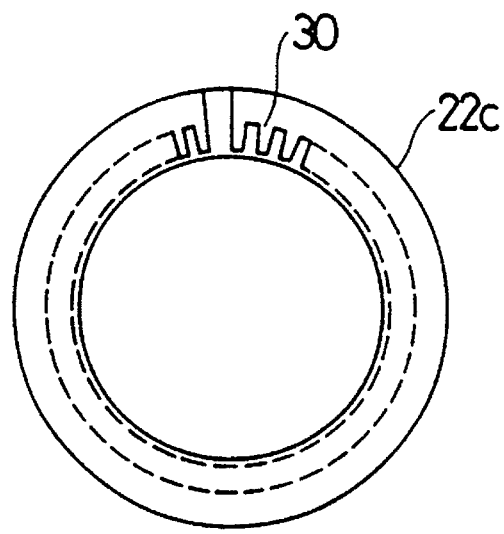
FIG. 30 is a plan of a printed board 22c.

FIG. 30 is a plan of the printed board 22c.

A zigzag wiring 30 is arranged near the circumference of the printed board 22c and its two terminals are lead out as shown in FIG. 30 to be connected with the terminals of the printed board 16 by the medium of the leads shown in a broken line 3a in FIG. 32.

An annular concave surface 1-2 near the circumference of the field magnet 1 faces the wiring 30 on the printed board.

The width of the N and S poles magnetized on the annular concave surface is the same with that of the wiring 30 of the printed board.

When the magnetic rotor rotates, the motor is put under a constant speed control by the aid of the induction output signal of the printed board wiring 30 just like the case of FIG. 31.

The concave surface 1-2 is not necessarily needed.

The circumference of the field magnet 1 may be magnetized as N and S poles alternately to fulfill the same purpose.

The speed detection device in this working example may be applied to the working example shown in FIG. 26 and reversely the speed detection device shown in FIG. 26 may be applied to this working example.

There are plural bores forming an intermittent circle on the printed board 22b. One 22e of them is shown in FIG. 32.

Plastic charged into the space necessary for forming the stationary armature by an injection machine occupies these bores connecting the space 17 with the space 17a.

Next, we explain below a work before the stationary armature 17 is formed.

Armature coils 20a, 20b are arranged on the upper surface of the printed board 22b as shown in FIG. 27 and fixed to it.

Next, the terminals of the armature-coils are connected with the corresponding terminals of the wiring of the printed board 22b.

Next, Hall elements 4a, 4b, 4c shown in squares in FIG. 27 are fixed at the intermediate positions of the armature coils.

They face the poles of the field magnet 1.

Next, the terminals of the Hall elements are connected with the corresponding terminals of the printed board 22b.

These input and output terminals of the printed board wiring are connected with the corresponding terminals of the printed board 16 by the medium of the lead 3b shown in a broken line in FIG. 32.

The annular magnetic body 21 is fixed to the rear surface of the printed board 22b by adhesive.

The stationary armature 17 is constituted by them and plastic charged into the space necessary for forming it by an injection machine.

When liquidized plastic plastic is injected into a mold, it must not flow into the space the hole elements occupy inside the armature coils.

The armature coils shown in FIG. 31 and 32 are wound on alignment.

As clarified from the above explanation, the action and the effect of this working example are the same with those of the previous working examples.

INDUSTRIAL PRACTICABILITY

The motor related to this invention is used as a driving source for every kind of industrial machine in which a flat structure such as a flexible disk, a hard disk, etc. is needed, particularly as a motor of high speed and of high torque.

I claim:

1. A 3 phase flat brushless and core-less direct-current motor of axial gap type comprising a plane stationary armature, a magnetic rotor including an annular field magnet with 2n N and S poles where n is even number and an armature current control device for controlling armature current by detecting the positions of field magnet poles of the magnetic rotor characterized in that plural fan-shaped and flatly-wound armature coils in which an included angle are constituted by each of their coil portions effective for producing a torque is nearly equal to that of the poles of magnetic rotor, a flat annular magnet body made of silicon steel of about 0.1 mm or less in thickness rolled thinly and coiled spirally, an annular stationary armature constituted by the (3/2) n armature coils arranged at equal pitches with their outside surfaces made radial and so that they do not lap over each other, the annular magnetic body to which the armature coils are fixed, wirings among the armature coils with their terminals lead out and plastic in which they are buried, a means for connecting a wiring to the said annular stationary armature after fixing it on a printed board of a steel base with wirings, and a shaft which is supported by bearings set in a central portion of a stationary rotor so that it rotates freely and fixed to the magnetic rotor with its pole surface facing the armature coils with a small gap therebetween, first, second and third Hall elements set on contact surfaces and near circumferences of the armature coils arranged in contact with the stationary armature and a pole position detection device for obtaining the first position detection signals of rectangular wave of 180 degrees in electrical angle in breadth at intervals of equal angle followed by second position detection signals of the same wave with a phase delay of 120 degrees in electrical angle from first ones at intervals of equal angle in turn and next by third position detection signals of the same wave with a phase delay of 120 degrees in electrical angle from second ones at intervals of equal angle in turn through the detection of the positions of the magnetic rotor poles by the first, the second and the third Hall elements.

2. A 3 phase flat brushless and core-less direct-current motor of axial gap type comprising a plane stationary armature, a magnetic rotor including an annular field magnet with 2n N and S poles where n is an even number and an armature current control device for controlling armature current by detecting positions of field magnet poles of the magnetic rotor characterized in that plural fan-shaped and flatly-wound armature coils in which an included angle constituted by each of their coil portions effective for producing a torque is nearly equal to that of the poles of the magnetic rotor, a flat annular magnetic body made of silicon steel of about 0.1 mm or less in thickness rolled thinly and coiled spirally, an annular stationary armature constituted by (3/2)n armature coils arranged at equal pitches with outside surfaces made radial and so that they do not lap over each other, the annular magnetic body to which the armature coils are fixed, wirings among the armature coils with their terminals lead out and plastic in which they are buried, and a shaft supported by bearings set in central portions of the stationary armature so that it rotates freely and fixed to the magnetic rotor with its pole surface facing the armature coils with a small gap therebetween, first, second and third Hall elements set on the contact surfaces and near the circumferences of the armature coils arranged in contact with the stationary armature and a pole position detection device for obtaining the first position detection signals of rectangular wave of 180 degrees in electrical angle in breadth at intervals of equal angle followed by second position detection signals of the same wave with a phase delay of 120 degrees in electrical angle from first ones at intervals of equal angle in turn and next by third position detection signals of the same wave with a phase delay of 120 degrees in electrical from second ones at intervals of equal angle in turn through the detection of the positions of the magnetic rotor poles by the first, the second and the third Hall elements.

3. A 3 phase flat brushless and core-less direct-current motor of axial gap type comprising a plane stationary armature, a magnetic rotor including an annular field magnet with 2n N and S poles where n is an even number and an armature current control device for controlling armature current by detecting the positions of field magnet poles of the magnetic rotor characterized in that plural fan-shaped and flatly-wound armature coils in which an included angle constituted by each of their coil portions effective for producing a torque is nearly equal to that of the poles of the magnetic rotor, a flat annular magnetic body made of silicon steel of about 0.1 mm or less in thickness rolled thinly and coiled spirally with a plastic ring of equal thickness set inside it, an annular stationary armature constituted by (3/2)n armature coils arranged at equal pitches with outside surfaces made radial and so that they do not lap over each other, the annular magnetic body to which the armature coils is fixed, wirings among the armature coils with their terminals lead out and plastic in which they are buried, a position detection device comprising 3 magnetism-electricity conversion elements set face to face with the poles of the field magnet between two adjacent armature coils near a circumference of the stationary armature, a rotor speed detection device set near the circumference of the stationary armature for obtaining electric signals in proportion to rotor speed, a means for inserting a short downward columnar projection of the stationary armature into a central bore of a printed board and fixing the armature to the printed board, a means for giving wirings among the wiring of the printed board, the terminals of the armature coils, the terminals of 3 magnetism-electricity conversion elements used for detecting positions and those of the rotor speed detection device, and a shaft which is supported by bearings set in a central portion of the stationary armature so that it rotates freely and fixed to the magnetic rotor so that its pole surface optionally faces a armature coil surface with a small gap therebetween.

4. A 3 phase flat brushless and core-less direct-current motor of axial gap type comprising a plane stationary armature, a magnetic rotor including an annular field magnet with 2n N and S poles where n is an even number and an armature current control device for controlling armature current by detecting positions of field magnet poles of the said magnetic rotor characterized in that plural fan-shaped and flat armature coils of alignment winding in which an included angle constituted by each of the coil portions effective for producing a torque is equal to that of the poles of the magnetic rotor, a flat annular magnetic body made of silicon steel of about 0.1 mm or less in thickness rolled thinly and coiled spirally inside which a plastic ring of equal thickness is set, a plane stationary armature constituted by (3/2)n armature coils arranged at equal pitches with the outside surfaces made radial and so that they do not lap over each other, the annular magnetic body to which the armature coils are fixed, a first printed board of an annular thin plastic base fixed concentrically on an opposite side of the annular magnetic body and plastic in which the above three elements are buried, a position detection device comprising 3 magnetism-electricity conversion elements set at proper positions on the first printed board of the stationary armature face to face with poles of the said field magnet, a rotor speed detection device for obtaining electric signals of a frequency in proportion to rotor speed through induction output of a zigzag wiring arranged near the circumference of the first printed board so as to form a circle at the same pitches with those of the N and S poles which face the first printed board and are magnetized at alternate equal pitches divided into pieces along the circumference of the field magnet, a means for inserting a short downward columnar projection of the stationary armature into a central portion of a second printed board and fixing the former to the latter, a means for giving necessary wirings between the output and input terminals of the [said]armature coils, the 3 magnetism-electricity conversion elements and the zigzag wiring of the first printed board and the terminals of the second printed board, and a shaft supported by bearings set in a central bore of the stationary armature so that it rotates freely and fixed to the magnetic rotor whose pole surface faces an armature coil surfaces with a small gap therebetween.

5. A 3 phase flat brushless and core-less direct-current motor of axial gap type comprising a plane stationary armature, a magnetic rotor including an annular field magnet with 2n N and S poles where n is an even number and an armature current control device for controlling armature current by detecting positions of field magnet poles of the said magnetic rotor characterized in that

- plane fan-shaped and flat armature coils of alignment winding in which an included angle constituted by each of coil portions effective for producing a torque is equal to that of the poles of the said magnetic rotor,
- a flat annular magnetic body made of silicon steel of about 0.1 mm or less in thickness rolled thinly and coiled spirally inside which a plastic ring of equal thickness is set,
- an annular stationary armature constituted by (3/2)n armature coils arranged at equal pitches with the outside surfaces made radial and so that they do not lap over each other, the annular magnetic body to which the armature coils are fixed, a first printed board of an annular thin plastic base fixed concentrically to the annular magnetic body and plastic in which the above three elements are buried,
- a position detection device comprising 3 magnetism-electricity conversion elements which are set at proper positions of the stationary armature face to face with poles of the field magnet,
- a rotor speed detection device set near the circumference of the stationary armature and the field magnet,
- a means for inserting a short downward columnar projection of the stationary armature into a central bore of a second printed board,
- a means for giving necessary wirings between the output and input terminals of the armature coils, the 3 magnetism-electricity conversion elements and the first printed board of the rotor speed detection device and the necessary terminals of the second printed board, and
- a shaft supported by bearings set in a central portion of the stationary armature so that it rotates freely and fixed to the said magnetic rotor whose pole surface faces an armature coil surface with a small gap therebetween.

* * * * *